(12) United States Patent
Buckmann et al.

(10) Patent No.: US 7,223,813 B2
(45) Date of Patent: May 29, 2007

(54) AQUEOUS VINYL POLYMER COATING COMPOSITIONS

(75) Inventors: Alfred Jean Paul Buckmann, Holland (NL); Emilio Martin, Holland (NL); Gerardus Cornelis Overbeek, Holland (NL); John Christopher Padget, Frodsham (GB); Jurgen Scheerder, Holland (NL); Tom Annable, Blackley (GB)

(73) Assignee: DSM IP Assets B.V., Heerien (NL)

( * ) Notice: Subject to any disclaimer, the term of this patent is extended or adjusted under 35 U.S.C. 154(b) by 0 days.

(21) Appl. No.: 10/380,950

(22) PCT Filed: Oct. 11, 2001

(86) PCT No.: PCT/GB01/04510

§ 371 (c)(1),
(2), (4) Date: Mar. 20, 2003

(87) PCT Pub. No.: WO02/33012

PCT Pub. Date: Apr. 25, 2002

(65) Prior Publication Data

US 2004/0039089 A1     Feb. 26, 2004

(30) Foreign Application Priority Data

Oct. 14, 2000   (GB) ................. 0025212.2

(51) Int. Cl.
*C08J 3/03*     (2006.01)
*C08L 33/00*    (2006.01)

(52) U.S. Cl. ............... 524/501; 524/502; 524/515; 524/522; 524/523; 524/804; 524/832

(58) Field of Classification Search ........... 524/804, 524/543, 556, 501
See application file for complete search history.

(56) References Cited

U.S. PATENT DOCUMENTS

| | | | |
|---|---|---|---|
| 4,139,514 A * | 2/1979 | Bassett ................. | 524/824 |
| 4,190,693 A | 2/1980 | Martorano et al. | |
| 4,925,893 A * | 5/1990 | Padget et al. ........... | 524/337 |
| 5,270,380 A * | 12/1993 | Adamson et al. ........ | 524/556 |
| 5,306,765 A * | 4/1994 | Kuriyama et al. ....... | 524/547 |
| 5,447,970 A * | 9/1995 | Tomita et al. .......... | 523/201 |
| 5,990,228 A * | 11/1999 | Eichman et al. ........ | 524/529 |
| 6,303,189 B1 * | 10/2001 | Gray et al. ........... | 427/385.5 |

FOREIGN PATENT DOCUMENTS

| | | |
|---|---|---|
| EP | 0 210 747 A1 | 2/1987 |
| JP | 55 035373 A | 3/1980 |
| JP | 60-110765 | 6/1985 |
| WO | WO 00/56827 | 9/2000 |

OTHER PUBLICATIONS

CRC Handbook of Chemistry and Physics, pp. 13-4-13-6, 2004.*

* cited by examiner

*Primary Examiner*—Vasu Jagannathan
*Assistant Examiner*—Vickey Ronesi
(74) *Attorney, Agent, or Firm*—Morgan Lewis & Bockius LLP

(57) ABSTRACT

An aqueous coating composition comprising a crosslinkable water-dispersible vinyl oligomer(s) wherein said composition when drying to form a coating has an open time of at least 20 minutes, a wet edge time of at least 10 minutes, a tack free time of $\leq 20$ hours and an equilibrium viscosity of $\leq 5,000$ Pa·s at any solids content when drying in the range of from 20 to 55 wt % using any shear rate in the range of from $9\pm0.5$ to $90\pm5$ $s^{-1}$ and at $23\pm2°$ C.

19 Claims, 2 Drawing Sheets

Shear rate 0.0997 s-1

Shear rate 0.990 s-1

AQUEOUS VINYL POLYMER COATING COMPOSITIONS

FIELD OF THE INVENTION

The present invention relates to certain aqueous ambient temperature crosslinkable and shelf stable vinyl polymer compositions which provide coatings having, inter alia, improved open and wet edge times as well as good tack-free times.

DESCRIPTION OF THE RELATED ART

A general need when applying a decorative or protective coating to a substrate is to be able to repair irregularities in the still-wet coating after some time has elapsed, for example by re-brushing over a freshly coated wet substrate, or by applying more of the coating composition over a previously coated substrate either over the main area of the coating or an edge of the coating or even blending a drop into the coating without in such case vitiating the complete merging of any boundaries in the vicinity of the repaired irregularity. Traditionally compositions containing binder polymers dissolved in organic solvents are used and the organic solvents are employed to modify the drying characteristics of the coated composition. For example, organic solvent-based alkyds with an open time of 30 to 45 minutes are available in the decorative "Do-it-Yourself" (DIY) market. However the disadvantage of organic solvent based coatings is the toxic and flammable nature of such solvents and the pollution and odour caused on evaporation as well as the relatively high cost of organic solvents.

Thus with the continuing concern about the use of organic solvent-based coating compositions there has been a long felt need for an aqueous coating compositions with comparable properties to those achievable using organic solvent based compositions.

Unfortunately, aqueous polymer coating compositions currently known to the art do not offer a combination of drying properties which would make them fully comparable (or even superior to) solvent-based coatings, and in particular do not provide desirably long open and wet edge times (as discussed above and also later) together with desirably short tack-free times (discussed later).

Thus, very commonly, aqueous-based polymer coating compositions employ dispersed high molecular weight polymers as the binder materials thereof. This results in, inter alia, a short wet edge time when the coating composition is dried because the dispersed polymer particles tend to coalesce in the edge region of an applied coating very soon after a wet coating has been applied (probably due to the maximum packing fraction of the polymer particles having been reached) to form a continuous film, and since the polymer of this film is of high viscosity because of the high molecular weight, the lapping (i.e. wet edge) time of the composition is poor.

It has been shown by viscosity measurements taken during drying that existing alkyd emulsions have a high viscosity phase inversion peak during drying. (Phase inversion is defined as the transition from a binder in a continuous water phase to water in a continuous binder phase which occurs during drying). The consequence is a difficulty in re-brushing which starts a few minutes after application of the coating.

It is known from the prior art that longer wet edge or open time is achievable by using solution-type aqueous oligomers (U.S. Pat. No. 4,552,908) which can be diluted with large amounts of solvent(s) in order to create a low viscosity continuous phase during drying of the film. However, these systems have high Volatile Organic Contents (VOC's) and are generally unacceptably water-sensitive.

Open time can also be prolonged by using evaporation suppressants (such as e.g. eicosanol), as described in for example EP 210747. However, water sensitivity is also a problem in this case. Moreover, the wet edge open time is insufficiently improved by using such evaporation suppressants.

From the literature it is also known that open time is easily prolonged by using low solids contents in the aqueous polymer compositions, but this generally results in the need to apply many layers of paint (for good opacity). In addition the wet edge time is generally only moderately influenced by reducing solids content of an aqueous coating composition with water.

Longer times for repairing irregularities can be achieved by employing aqueous polymer coating compositions in which the binder polymers have very low viscosities. However, hitherto, a problem with using such low viscosity polymer binders, is that the resultant coatings have a slow drying rate, resulting in the coating remaining tacky for an unacceptably long time. A coating should preferably also dry sufficiently quickly to avoid the adherence of dust and to ensure that the coating quickly becomes waterproof (in case of outdoor applications), and as discussed above quickly becomes tack-free.

Indeed, the difficulty in developing aqueous polymer coating compositions having a desirable combination of drying properties when coated onto a substrate has been particularly discussed in a recent interview given by Professor Rob van der Linde (Professor of Coatings Technology, University of Technology, Eindhoven, NL) and Kees van der Kolk (Sigma Coatings) and reported in "Intermediair" Oct. 6, 1999, 35(23), pages 27–29. In this interview concerning environmentally friendly paints, there is described the problem of applying aqueous paints where even the professional painter has little enough time to correct any irregularities when needed. This is contrasted (in the interview) with solvent-based paints (e.g. alkyd paints) which are workable for a much longer time but have the disadvantage that the organic solvents forming a major component of such compositions are toxic and expensive. The interview also mentions that in the coming years, three universities will cooperate in a project to overcome the drying disadvantage of aqueous paints. Thus the interview emphasises the current and continuing need and desirability for achieving aqueous polymer coatings compositions having improved drying properties.

The open time for a coating composition is, in brief, the period of time that the main area (the bulk) of an applied aqueous coating remains workable after it has been applied to a substrate, in the sense that during this period re-brushing or application of more coating over the main area of a freshly coated wet substrate is possible without causing defects such as brush marks in the final dried coating. (A more formal definition of open time is provided later in this specification).

The wet edge time for a coating composition is, in brief, the period of time that the edge region of an applied aqueous coating remains workable after it has been applied to a substrate, in the sense that during this period re-brushing or application of more coating over the edge region of a freshly coated wet substrate is possible without causing defects such as lap lines in the final dried coating. A more formal definition of wet edge time is provided later in this specification.

EP 425085 discloses water based autoxidisable coating compositions comprising a partially esterified carboxylic acid functional film forming copolymer derived from olefinically unsaturated monomers; is taught therein that it is essential for all or most of the autoxidisable groups to be 3-allyloxy-2-hydroxypropyl groups (or the 3-alkylallyl or butyl analogues), in order for the copolymer to retain a high degree of water solubility. This approach however is expected to result in the final coating having inadequate water resistance for many applications and additionally not to give the long open times and lapping times characteristic of solvent borne paints. Still further, while a comparative example employs fatty acid groups in the copolymer (a preferred characteristic of the present invention—see later) it has unacceptably high viscosity.

U.S. Pat. No. 5,422,394 is a further development of the teaching of EP 425085 in which the water sensitivity of the final coating is said to be reduced by limiting the concentration of neutralising cations required to solubilise the film forming polymer. Nevertheless this modification does not reduce the water sensitivity to an acceptable level or to the level of existing solvent borne paints because of the water solubility of the copolymer.

U.S. Pat. No. 5,270,380 discloses an aqueous composition containing a combination of a latex polymer and a modifying compound where the modifying compound and the latex polymer contain groups which are reactable with each other prior to coating a substrate with the composition. However the maximum open time achieved by this method was only 15 minutes which is not considered to be sufficient for the majority of coating applications.

U.S. Pat. No. 6,040,368 discloses an aqueous coating composition with an extended open time, the composition including an emulsion polymer with a pendant acetate or acetamide groups, a polyether amine and an alkyl polyglycoside. However, no open times greater that 10 minutes were achieved.

U.S. Pat. No. 4,386,180 discloses a water-based composition comprising an acrylic latex and a drying oil with an open time of 1 to 3 minutes which is clearly not long enough for most coating applications.

U.S. Pat. No. 4,139,514 discloses the addition of water-soluble, acid rich oligomer to a latex to give an open time in excess of 20 minutes. However, this patent is limited to using an alkali-soluble oligomer which will result in high water sensitivity of the final coating, thus requiring an additional curing step at a high temperature U.S. Pat. No. 4,552,908 describes low molecular weight polymers stabilised with anionic or cationic groups in combination with non-ionic groups which can contain crosslinking groups like autoxidisable groups (although these are not exemplified). A variety of low molecular weight polymers are described including vinyl polymers. These polymers must be film forming and contain acid and a wet edge time of >10 minutes is described. However, the combination of properties such as claimed in the present invention (see later) is not described. All the oligomers mentioned in this patent are water soluble as in EP 425085 and U.S. Pat. No. 5,422,394, and so will also be water sensitive in final application. Furthermore, there is no mention of oligomer in combination with a dispersed polymer, which is a preferred feature of the present invention (see later).

BRIEF SUMMARY OF THE INVENTION

We have now invented aqueous polymer coating compositions having a very advantageous combination of properties, particularly with regard to open time, wet edge time, and tack-free time as discussed above, and which (surprisingly in view of comments by van der Linde and van der Kolk) avoid the drawbacks of the currently available composition.

According to the present invention there is provided an aqueous coating composition comprising a crosslinkable water-dispersible vinyl oligomer(s) wherein said composition when drying to form a coating has the following properties:

i) an open time of at least 20 minutes;
ii) a wet-edge time of at least 10 minutes;
iii) a tack-free time of $\leq 20$ hours;
iv) 0 to 25% of co-solvent by weight of the composition; and
v) an equilibrium viscosity of $\leq 5,000$ Pa·s, at any solids content when drying in the range of from 20 to 55% by weight of the composition, using any shear rate in the range of from $9\pm 0.5$ to $90\pm 5$ s$^{-1}$ and at $23\pm 2°$ C.

DETAILED DESCRIPTION OF THE INVENTION

Open time is more formally defined as the maximum length of time, using the test method and under the specified conditions described later in which a brush carrying the aqueous composition of the invention can be applied to the main area of a coating of the aqueous composition of the invention after which the coating flows back so as to result in a homogenous film layer.

Preferably the open time is at least 25 minutes, more preferably at least 30 minutes and most preferably at least 35 minutes.

Wet edge time is more formally defined as the maximum length of time, using the test method, under the specified conditions described herein, in which a brush carrying the aqueous composition of the invention can be applied to the edge region of a coating of the aqueous composition of the invention after which the coating flows back without leaving any lap lines so as to result in a homogenous film layer.

Preferably the wet-edge time is at least 12 minutes, more preferably at least 15 minutes most preferably at least 18 minutes and especially at least 25 minutes.

The drying process of an invention composition can be divided into four stages namely the period of time necessary to achieve, respectively, dust-free, tack-free, sandable and thumb-hard coatings using the test methods described herein.

Preferably the dust free time is $\leq 4$ hours, more preferably $\leq 2$ hours and most preferably $\leq 50$ minutes.

Preferably the tack-free time is $\leq 15$ hours, more preferably $\leq 12$ hours and most preferably $\leq 8$ hours.

Preferably the thumb hard time is $\leq 48$ hours, more preferably $\leq 24$ hours, most preferably $\leq 16$ hours and especially $\leq 10$ hours.

Preferably the resultant coating is sandable within 72 hours, more preferably within 48 hours, still more preferably within 24 hours and especially within 16 hours.

A co-solvent, as is well known in the coating art, is an organic solvent employed in an aqueous coating composition to improve the drying characteristics thereof.

The co-solvent may be solvent incorporated or used during preparation of the vinyl oligomer(s) or may have been added during formulation of the aqueous composition.

The equilibrium viscosity of the aqueous coating composition when measured under the conditions as described above, is a suitable method for illustrating the drying characteristics of the aqueous coating composition. By the equilibrium viscosity of an aqueous composition at a particular shear rate and solids content is meant the viscosity measured when the aqueous composition has been subjected to the shear rate for long enough to ensure that the viscosity measurement has reached a constant value.

If the composition is to remain brushable and workable during drying so that it has the desired open time and wet edge time, it is necessary that its equilibrium viscosity does not exceed defined limits during the drying process and hence over a range of solids contents. Accordingly the crosslinkable water-dispersible vinyl oligomer(s) which are used in this invention do not give a significant phase inversion viscosity peak, if any at all, during the drying process when the system inverts from one in which water is the continuous phase to one in which the crosslinkable water-dispersible vinyl oligomer(s) is the continuous phase.

The shear rate to measure the equilibrium viscosity is preferably any shear rate in the range of from $0.9\pm0.05$ to $90\pm5$ s$^{-1}$, more preferably any shear rate in the range of from $0.09\pm0.005$ to $90\pm5$ s$^{-1}$.

Preferably the equilibrium viscosity of the aqueous coating composition of the invention is $\leq 3000$ Pa·s, more preferably $\leq 1500$ Pa·s, still more preferably $\leq 500$ Pa·s, especially $\leq 100$ Pa·s and most especially $\leq 50$ Pa·s when measured as defined above.

Preferably, the composition of the invention has an equilibrium viscosity $\leq 5,000$ Pa·s when measured using any shear rate in the range of from $0.09\pm0.005$ to $90\pm5$ s$^{-1}$, and an equilibrium viscosity of $\leq 3,000$ Pa·s when measured using any shear rate in the range of from $0.9\pm0.05$ to $90\pm5$ s$^{-1}$, and an equilibrium viscosity of $\leq 1,500$ Pa·s when measured using any shear rate of from $9\pm0.5$ to $90\pm5$ s$^{-1}$, at any solids content when drying in the range of from 20 to 55% by weight of the composition and at $23\pm2°$ C.

More preferably, the composition of the invention has an equilibrium viscosity of $\leq 3,000$ Pa·s when measured using any shear rate in the range of from $0.09\pm0.005$ to $90\pm5$ s$^{-1}$, and an equilibrium viscosity of $\leq 1,500$ Pa·s when measured using any shear rate in the range of from $0.9\pm0.05$ to $90\pm5$ s$^{-1}$, and an equilibrium viscosity of $\leq 500$ Pa·s when measured using any shear rate in the range of from $9\pm0.5$ to $90\pm5$ s$^{-1}$, at any solids content when drying in the range of from 20 to 55% by weight of the composition and at $23\pm2°$ C.

Most preferably, the composition of the invention has an equilibrium viscosity of $\leq 1500$ Pa·s when measured using any shear rate in the range of from $0.09\pm0.005$ to $90\pm5$ s$^{-1}$, and an equilibrium viscosity of $\leq 200$ Pa·s when measured using any shear rate in the range of from $0.9\pm0.05$ to $90\pm5$ s$^{-1}$, and an equilibrium viscosity of $\leq 100$ Pa·s when measured using any shear rate of from $9\pm0.5$ to $90\pm5$ s$^{-1}$, at any solids content when drying in the range of from 20 to 55% by weight of the composition and at $23\pm2°$ C.

Preferably the equilibrium viscosity of the composition of the invention is $\leq 5000$ Pa·s, more preferably $\leq 3000$ Pa·s when measured using any shear rate in the range of from $0.9\pm0.05$ to $90\pm5$ s$^{-1}$, more preferably using any shear rate in the range of from $0.09\pm0.005$ to $90\pm5$ s$^{-1}$; after a 12%, preferably a 15% and most preferably an 18% increase in the solids content by weight of the composition when drying.

A 12% increase in the solids content by weight of the composition means for example going from a solids content of 35 to 47% by weight of the composition.

Preferably the solids content of the aqueous coating composition when determining the equilibrium viscosity is in the range of from 20 to 60%, more preferably in the range of from 20 to 65%, still more preferably in the range of from 20 to 70% and especially in the range of from 20 to 75% by weight of the composition.

In a preferred embodiment of the present invention said vinyl oligomer(s) has a solution viscosity $\leq 150$ Pa·s, as determined from a 80% by weight solids solution of the crosslinkable vinyl oligomer(s) in at least one of the solvents selected from the group consisting of N-methylpyrrolidone, n-butylglycol and mixtures thereof, using a shear rate of $90\pm5$ s$^{-1}$ and at $50\pm2°$ C.

A choice of solvents for determining the solution viscosity of the vinyl oligomer(s) is provided herein because the nature of the vinyl oligomer(s) may affect its solubility.

Preferably the solution viscosity of the crosslinkable vinyl oligomer(s) is $\leq 100$ Pa·s, especially $\leq 50$ Pa·s and most especially $\leq 30$ Pa·s when measured as defined above.

Alternatively in this embodiment of the invention, and more preferably, the solution viscosity of the vinyl oligomer(s) may be measured at $23\pm2°$ C., and the crosslinkable vinyl oligomer(s) may thus also be described as preferably having a solution viscosity $\leq 250$ Pa·s, as determined from a 70% by weight solids solution of the crosslinkable vinyl oligomer(s) in a solvent mixture consisting of:

i) at least one of the solvents selected from the group consisting of N-methylpyrrolidone, n-butylglycol and mixtures thereof;

ii) water and iii) N,N-dimethylethanolamine;

where i), ii) and iii) are in weight ratios of 20/7/3 respectively, using a shear rate of $90\pm5$ s$^{-1}$ and at $23\pm2°$ C.

Preferably in the preceding alternative the solution viscosity of the vinyl oligomer(s) is $\leq 100$ Pa·s, more especially $\leq 50$ Pa·s, still more especially $\leq 35$ Pa·s and most especially $\leq 20$ Pa·s, when measured as defined herein at $23\pm2°$ C.

If a mixture of N-methylpyrrolidone (NMP) and n-butylglycol (BG) is used, preferably the ratio of NMP:BG is in the range of from 0.01:99.9 to 99.9:0.01, more preferably the ratio of NMP:BG is in the range of from 0.01:99.9 to 10:90 and in the range of from 90:10 to 99.9:0.01, and most preferably the ratio of NMP:BG is in the range of from 0.5:99.5 to 5:95 and in the range of from 95:5 to 99.5:0.5.

In a special embodiment of the present invention the wet edge time in minutes of the aqueous coating composition is at least Q/(wt. % solids of the aqueous coating composition)$^{0.5}$, wherein the solids content of the aqueous coating composition is between 15 and 70 wt. %, more preferably between 30 and 65 wt. % and most preferably between 40 and 60 wt. % and Q is a constant of 84 more preferably of 100, most preferably of 126 and especially of 151.

The crosslinkable vinyl oligomer(s) may crosslink at ambient temperature by a number of mechanisms including but not limited to autoxidation, Schiff base crosslinking and silane condensation. By crosslinking by autoxidation is meant that crosslinking results from oxidation occurring in the presence of air and which usually involves a free radical mechanism and is preferably metal-catalysed, resulting in covalent crosslinks. By Schiff base crosslinking is meant that crosslinking takes place by the reaction of a carbonyl functional group(s) where by a carbonyl functional group herein is meant an aldo or keto group and including an enolic carbonyl group such as is found in an acetoacetyl group, with a carbonyl-reactive amine and/or hydrazine (or blocked amine and/or blocked hydrazine) functional group. Examples of carbonyl-reactive amine (or blocked amine) functional groups include ones provided by the following compounds or groups: R—NH$_2$, R—O—NH$_2$, R—O—N=C<, R—NH—C(=O)—O—N=C< and R—NH—C(=O)—O—NH$_2$ or blocked hydrazine where R is optionally substituted $C_1$ to $C_{15}$, preferably $C_1$ to $C_{10}$ alkylene, optionally substituted alicyclic or optionally substituted aryl or R may also be part of a polymer. Examples of carbonyl-reactive hydrazine (or blocked hydrazine) groups include R—NH—NH$_2$, R—C(=O)—NH—NH$_2$, R—C(=O)—NH—N=C<, R—NH—C(=O)—NH—NH$_2$ and R—NH—C(=O)—NH—N=C< where R is as described above. By silane condensation is meant the reaction of alkoxy silane or —SiOH groups in the presence of water, to give siloxane bonds by the elimination of water and/or alkanols (for example methanol) during the drying of the aqueous coating composition.

Preferably the crosslinkable vinyl oligomer(s) is a self-crosslinkable vinyl oligomer(s) (i.e. crosslinkable without the requirement for added compounds which react with groups on the vinyl oligomer(s) to achieve crosslinking, although these can still be employed if desired). Preferably the crosslinking is by autoxidation, optionally in combination with other crosslinking mechanisms as discussed herein. Suitably autoxidation is provided for example by fatty acid groups containing unsaturated bonds (by which is meant the residue of each fatty acids of which have become incorporated into the vinyl oligomer by reaction at their carboxyl (groups) or by (meth)allyl functional residues, β-keto ester or β-keto amide groups. It may also be provided (at least in part) by terminal unsaturated bonds in the vinyl oligomer(s) if made using a catalytic chain transfer polymerisation process as discussed later. Preferably autoxidation is provided at least by fatty acid groups containing unsaturated bonds and, in cases where (meth)allyl groups are used, it is preferred that the ratio unsaturated fatty acid groups to (meth)allyl groups is ≧2:1, more preferably ≧3:1, and still more preferably ≧5:1; most preferably, however, no (meth)allyl groups are present.

Preferably the concentration of unsaturated fatty acid groups (if present) in the autoxidisably crosslinkable vinyl oligomer(s) is 10 to 80%, preferably 12 to 70%, most preferably 15 to 60% by weight based on the weight of the vinyl oligomer(s). If combined with other autoxidisable groups in the aqueous coating composition, the fatty acid group content may more readily be below 10% by weight of the vinyl oligomer(s). For the purpose of determining the fatty acid group content of the vinyl oligomer(s), it is convenient for practical purposes to use the weight of the fatty acid reactant including the carbonyl group but excluding the hydroxyl group of the terminal acid group of the fatty acid. Suitable unsaturated fatty acids for providing fatty acid groups in the vinyl oligomer(s) include fatty acids derived from vegetable and non-vegetable oil such as soyabean oil, palm oil, linseed oil, tung oil, rapeseed oil, sunflower oil, tallow oil, (dehydrated) castor oil, safflower oil and fatty acids such as linoleic acid, linolenic acid, palmitoleic acid, oleic acid, eleostearic acid, licanic acid, arachidonic acid, ricinoleic acid, erucic acid, gadoleic acid, clupanadonic acid and/or combinations thereof. Particularly preferred is a vinyl oligomer(s) in which the autoxidisable groups are derived only from unsaturated fatty acids. Preferably at least 40% by weight, more preferably at least 60% by weight of the unsaturated fatty acid groups contain at least two unsaturated groups.

Other crosslinking mechanisms known in the art include those provided by the reaction of epoxy groups with amino, carboxylic acid or mercapto groups, the reaction of mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with β-diketo (for example acetoacetoxy or acetoamide) groups. The use of blocked crosslinking groups may be beneficial.

The crosslinkable vinyl oligomer(s) may be completely water-soluble or only have partial or low solubility in water. Preferably the crosslinkable vinyl oligomer(s) only has partial or little solubility in water. If the crosslinkable vinyl oligomer(s) is only partially or little soluble in water, it preferably has low water solubility in a pH range of from 2 to 10 and is either self-dispersible in water (i.e. dispersible by virtue of a sufficient concentration of selected bound (in-chain, chain-pendant and or chain-terminal) hydrophilic groups built into the vinyl oligomer(s), and thus not requiring high shear techniques and/or added surfactants to produce the dispersion, although such methods can also be included if desired), or is only dispersible in water with the aid of added (i.e. external) surface active agents and/or the use of high shear mixing. Low water solubility confers the advantage of a reduced water-sensitivity of the applied coating. Such low water solubility is defined herein as the crosslinkable vinyl oligomer(s) being less than 70% by weight soluble in water throughout the pH range of from 2 to 10 as determined for example by a centrifuge test as described herein. Preferably the crosslinkable vinyl oligomer(s) is ≦60%, more preferably ≦50% most preferably ≦30% by weight soluble in water throughout the pH range of from 2 to 10.

The crosslinkable vinyl oligomer(s) preferably contains a sufficient concentration of bound hydrophilic water-dispersing groups capable of rendering the oligomer(s) self-water-dispersible, but the concentration of such groups is preferably not so great that the oligomer(s) has an unacceptably high water solubility in order to not compromise the water sensitivity of the final coating.

The type of hydrophilic groups capable of rendering the crosslinkable vinyl oligomer(s) self water-dispersible are well known in the art, and can be ionic water-dispersing groups or non-ionic water-dispersing groups. Preferably non-ionic water-dispersing groups are used. Preferred non-ionic water-dispersing groups are polyalkylene oxide groups, more preferably polyethylene oxide groups. A small segment of the polyethylene oxide group can be replaced by propylene oxide segment(s) and/or butylene oxide segment(s), however the polyethylene oxide group should still contain ethylene oxide as a major component. When the water-dispersible group is polyethylene oxide, the preferred ethylene oxide chain length is >4 ethylene oxide units, preferably >8 ethylene oxide units and most preferably >15 ethylene oxide units. Preferably the polyethylene oxide group has a Mw from 175 to 5000 Daltons, more preferably from 350 to 2200 Daltons, most preferably from 660 to 2200 Daltons. Preferably the vinyl oligomer(s) has a polyethylene oxide content of 0 to 45% by weight, more preferably 0 to 30% by weight and still more preferably 2 to 20% by weight and especially 3 to 15% by weight.

Preferred ionic water-dispersing groups are anionic water-dispersing groups, especially carboxylic, phosphonic and or sulphonic acid groups. The anionic water-dispersing groups are preferably fully or partially in the form of a salt. Conversion to the salt form is optionally effected by neutralisation of the crosslinkable vinyl oligomer(s) with a base, preferably during the preparation of the crosslinkable vinyl oligomer(s) and/or during the preparation of the composition of the present invention. The anionic water-dispersing groups may in some cases be provided by the use of a monomer having an already neutralised acid group in the vinyl oligomer(s) synthesis so that subsequent neutralisation is unnecessary. If anionic water-dispersing groups are used in combination with non-ionic water-dispersing groups, neutralisation may not be required. Alternatively anionic dispersing groups may also be introduced by using blocked acids like tertiary butyl methacrylate, which can readily be hydrolysed upon dispersion.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives counter ions which may be desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised (for example with dimethylsulphate).

The crosslinkable vinyl oligomer(s) preferably has a weight average molecular weight (Mw) in the range of from 1,000 to 80,000 Daltons, more preferably in the range of from 1,000 to 50,000 Daltons, still more preferably in the range of from 1,200 to 30,000 Daltons, and most preferably in the range of from 5,000 to 20,000 Daltons. If the crosslinkable vinyl oligomer(s) is prepared from a reactive precursor vinyl oligomer(s) (see later), then the Mw of the precursor oligomer is preferably in the range of from 1000 to 20,000 Daltons, more preferably in the range of from 1000 to 10,000 Daltons, and most preferably in the range of from 1000 to 5000 Daltons.

For the purpose of this invention any molecular species mentioned herein with a molecular weight <1000 Daltons is classified as either a reactive diluent or a plasticiser and is therefore not taken into account for the determination of the Mw, Mn or PDi. When Daltons are used to give molecular weight data it should be understood that this is not a true molecular weight, but a molecular weight measured against polystyrene standards.

Preferably a significant part of any crosslinking reaction only takes place after application of the aqueous coating composition to a substrate, in order to avoid an excessive molecular weight build up in the invention composition prior to such application (by precrosslinking) which may lead to unacceptably increased viscosity of the aqueous coating composition on the substrate in the early stages of drying.

The molecular weight limits suitable to obtain the preferred low solution viscosity of the crosslinkable vinyl oligomer(s) as defined above may depend in part on the amount and type of co-solvent if present in the aqueous composition of the invention. Thus a higher molecular weight limit is possible when there is more co-solvent in the composition, and the lower molecular weight preferences are more applicable to low or zero co-solvent concentrations. Furthermore, if a branched vinyl oligomer(s) is used, higher molecular weight limits are preferred as branched structures tend to give a lower viscosity than a linear structure for any given Mw.

The molecular weight distribution (MWD) of the crosslinkable vinyl oligomer(s) has an influence on the equilibrium viscosity of the aqueous composition of the invention and hence an influence on the open time. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw crosslinkable vinyl oligomer(s). Preferably the value of PDi is $\leq 15$, more preferably $\leq 10$, and most preferably $\leq 5$. In a preferred embodiment of the invention the value of the $Mw \times PDi^{0.8}$ of the crosslinkable vinyl oligomer(s) is $\leq 300,000$ and more preferably the $Mw \times PDi^{0.8}$ is $\leq 220,000$. A specific PDi preference for a reactive precursor vinyl oligomer(s) (if used—see later) is in the range of from 1.1 to 1.9 for Mw's of the resulting crosslinkable vinyl oligomer(s) in the range of from 1000 to 40,000 Daltons, although normally such low values can only be obtained by very specific synthetic methods. One such method is to utilise catalytic chain transfer polymerisation when preparing very low molecular weight polymers (see later), and it has been found that this technique is especially effective for preparing a precursor vinyl oligomer(s). Another method of preparing vinyl oligomer(s) with particularly lower PDi's is to utilise anionic polymerisation techniques. However this procedure is much less preferred because of the high cost and the limitation in monomer types which can be polymerised by this technique. Alternatively other techniques include the so called "living" free radical polymerisation techniques such as atom transfer radical polymerisation, group transfer polymerisation, nitroxide mediated polymerisations and RAFT (reversible addition fragmentation chain transfer) polymerisations.

The crosslinkable vinyl oligomer(s) may comprise a single crosslinkable vinyl oligomer or a mixture of crosslinkable vinyl oligomers. The crosslinkable vinyl oligomer(s) may optionally be used in conjunction with a crosslinkable oligomer(s) of a non-vinyl type which has a solution viscosity within the same preferred limits as the solution viscosity of the vinyl oligomer(s). Indeed up to 90% by weight of the crosslinkable oligomer(s) in the invention may be of a non-vinyl type. The crosslinkable oligomer(s) (vinyl-type plus, if present, non-vinyl type) may optionally be used in conjunction with up to 250% by weight thereof of any type of non-crosslinkable oligomer(s) (vinyl and/or non-vinyl type) provided that the non-crosslinkable oligomer(s) has a solution viscosity within the preferred ranges defined above for the solution viscosity of the crosslinkable vinyl oligomer(s). In such cases more preferably up to 120 wt % of the non-crosslinkable oligomer(s) (based on the wt % of crosslinkable oligomer(s)), especially up to 30 wt. %, more especially up to 10 wt. % and most especially 0 wt. % is used.

Oligomer(s) of a non-vinyl type include but are not limited to for example polyurethane oligomer(s), polyester oligomer(s), polyamide oligomer(s), polyether oligomer(s), polycarbonate oligomer(s) and/or polysiloxane oligomer(s)

and the non-vinyl type oligomer(s) may optionally be branched, hyperbranched or dendritic.

The crosslinkable vinyl oligomer(s) is usually derived from free radically polymerisable olefinically unsaturated monomer(s), and can contain polymerised units of a wide range of such monomers, especially those commonly used to make binders for the coatings industry. The free radically polymerisable olefinically unsaturated monomer(s) may include monomers which carry for example crosslinker groups or (if to be present) hydrophilic water-dispersing groups which thus may be introduced directly in the vinyl oligomer by free radical polymerisation, or alternatively crosslinker groups and (if to be used) hydrophilic water-dispersing groups may be introduced by a reaction of a reactive precursor vinyl oligomer using a reactive compound bearing a crosslinker group(s) or a hydrophilic group(s) as the case may be (see later for more detail). By a vinyl oligomer (or precursor vinyl oligomer) herein is meant a homo- or co-oligomer (or homo- or co-precursor oligomer) derived from the addition polymerisation (using a free radical initiated process which may be carried out in an aqueous or non-aqueous medium) of one or more olefinically unsaturated monomers. Therefore by a vinyl monomer is meant an olefinically unsaturated monomer. The vinyl oligomer(s) of the composition of the invention preferably has an acid value of in the range of from 0 to 80 mg KOH/g, more preferably in the range of from 0 to 30 mg KOH/g most preferably in the range of from 10 to 30 mg KOH/g. A particularly preferred vinyl oligomer(s) is an acrylic oligomer(s) (i.e. based predominantly on at least one ester of acrylic or methacrylic acid).

Examples of vinyl monomers which may be used to form a vinyl oligomer (or precursor vinyl oligomer) include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl ethers, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

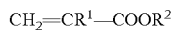
$$CH_2=CR^1—COOR^2$$

wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Particularly preferred is a vinyl oligomer (or precursor vinyl oligomer) made from a monomer system comprising at least 40 weight % of one or more monomers of the formula $CH_2=CR^1COOR^2$ as defined above. Such a preferred vinyl oligomer (or precursor vinyl oligomer) is defined herein as an acrylic oligomer (or precursor acrylic oligomer). More preferably, the monomer system contains at least 50 wt. % of such monomers, and particularly at least 60 wt. %. The other monomer(s) in such acrylic oligomer(s) (if used) may include one or more of the other vinyl monomers mentioned above, and/or may include ones different to such other monomers. Particularly preferred monomers include butyl acrylate (all isomers), butyl methacrylate (all isomers), methyl methacrylate (all isomers), ethyl hexyl methacrylate, esters of (meth)acrylic acid, acrylonitrile, vinyl acetate and styrene.

The crosslinker groups may, as mentioned briefly above, be introduced into a vinyl oligomer using two general methods: i) by utilising in the polymerisation process to form a vinyl oligomer, a vinyl comonomer(s) which carries a crosslinker group; and ii) utilising a precursor vinyl oligomer bearing selected reactive groups and which precursor oligomer is subsequently reacted with a compound carrying a crosslinker group and also a reactive group of the type which will react with the selected reactive groups on the precursor vinyl oligomer to provide attachment of the crosslinker group to the oligomer via covalent bonding. An example of i) is the preparation of an adduct of GMA (glycidylmethacrylate) and an unsaturated fatty acid to form a methacrylate bearing an unsaturated fatty acid residue as a crosslinker group, and then using this as a comonomer in the polymerisation synthesis of the crosslinkable vinyl oligomer. An example of ii) is the initial formation of a precursor vinyl oligomer bearing epoxide groups by employing GMA as a comonomer in the synthesis of the precursor oligomer and then reacting this with an unsaturated fatty acid whereby the acid and epoxide groups react to attach the unsaturated fatty acid residue crosslinker group by covalent bonding.

Other crosslinker groups such as acetoacetoxy groups may be introduced into a vinyl oligomer by utilising a comonomer such as acetoacetoxy methacrylate in a free radical polymerisation (method (i)) or reacting a compound having a β-diketone group with primary or secondary amine groups on a precursor vinyl oligomer to form enamines which are also effective as crosslinker groups (method (ii)).

The hydrophilic water-dispersing groups (if present) can be introduced by methods analogous to those for introducing crosslinker groups, for example i) utilising in the synthesis of the vinyl oligomer(s) a vinyl comonomer which carries a hydrophilic water-dispersing group (for example an olefinically unsaturated monocarboxylic, sulphonic and/or dicarboxylic acid, such as acrylic acid, methacrylic acid, β-carboxy ethylacrylate, fumaric acid or itaconic acid, an amide such as (meth)acrylamide, or a polyethyleneoxide containing (meth)acrylate monomer such as methoxy(polyethyleneoxide (meth)acrylate) or a hydroxyalkyl (meth)acrylate like hydroxyethyl (meth)acrylate HE(M)A, or alternatively ii) utilising a precursor vinyl oligomer bearing selective reactive groups which is subsequently reacted with a compound carrying a water-dispersing group and also a reactive group of the type which will react with the selected reactive groups on the precursor vinyl oligomer to provide attachment of the water-dispersing group to the oligomer via covalent bonding. An example of the second method (ii) is where an epoxy functional reactive precursor oligomer is formed utilising GMA as a comonomer, which precursor oligomer is then reacted with an amine terminated polyethyleneoxide (such as certain members of the Jeffamine series available from Huntsman) whereby polyethyleneoxide water dispersing groups become attached to the oligomer. Alternatively acetoacetoxy ethyl methacrylate (AAEM) instead of GMA can be used to bond the amine terminated polyethyleneoxide to the vinyl oligomer (the reaction then being between acetoacetoxy and amine groups).

The vinyl oligomer(s) may optionally contain other functional groups (i.e. different to those already mentioned above) to contribute to the crosslinking of vinyl oligomer(s) in the coating. Examples of such other groups include unsaturated groups provided in the larger context of maleic, fumaric, acryloyl, methacryloyl, styrenic and allylic groups and mercapto groups.

The glass transition temperature (Tg) of the precursor vinyl oligomer(s) may vary within a wide range. The precursor vinyl oligomer(s) is the vinyl oligomer(s) before functionalisation with fatty acid groups. The Tg as measured by modulated differential scanning calorimetry (DSC) is preferably in the range of from −90 to 120° C., more preferably in the range of from −70 to 80° C. Particularly preferred is that the Tg of the precursor vinyl oligomer(s) is in the range of from −60 to 60° C., more preferably in the range of from −50 to 30° C.

The crosslinkable vinyl oligomer(s) or (if used) precursor vinyl oligomer(s) is preferably prepared by free radical polymerisation, although in some circumstances anionic polymerisation may be utilised. The free radical polymerisation can be performed by techniques known in the art, for example as emulsion polymerisation, solution polymerisation, suspension polymerisation or bulk polymerisation.

If a precursor vinyl oligomer(s) is utilised (i.e. using method (ii)), one preferred technique for preparing it is to perform a solution polymerisation in a water-miscible or a water-immiscible solvent. This technique is beneficial because subsequent functionalisation reactions to introduce the crosslinker groups and, if desired, the water-dispersing groups can then be conveniently and efficiently performed in the solution of the precursor vinyl oligomer. When the solvent is water-miscible it may aid the subsequent dispersion of the crosslinkable oligomer in water. The solvent may then be either removed by evaporation or left in the dispersion.

Emulsion polymerisation is a preferred technique when the crosslinker groups are directly introduced by employing method (i) for example by using a GMA/fatty acid adduct as a comonomer, since the resultant crosslinkable vinyl oligomer(s) is then obtained directly in the form of an aqueous dispersion, avoiding the need for a separate dispersion step. When emulsion polymerisation is employed to make the crosslinkable vinyl oligomer(s), it is convenient to also introduce any hydrophilic water-dispersing groups by a comonomer approach (method (i)).

A free-radical polymerisation of vinyl monomer(s) to form a crosslinkable vinyl oligomer(s) or precursor vinyl oligomer(s) will require the use of a free-radical-yielding initiator(s) to initiate the vinyl polymerisation. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and iso-ascorbic acid. Azo compounds such as azoisobutyronitrile may also be used. Metal compounds such Fe.EDTA (EDTA is ethylene diamine tetracetic acid) may also be usefully employed as part of the redox initiator system. It is possible to use an initiator system partitioning between the aqueous and organic phases, e.g. a combination of t-butyl hydroperoxide, iso-ascorbic acid and Fe.EDTA. The amount of initiator or initiator system to use is conventional, e.g. within the range 0.05 to 6 wt. % based on the total vinyl monomer(s) used.

As stated above, a preferred feature of the invention is a low solution viscosity for the vinyl oligomer(s) (as defined) which may be obtained by controlling the molecular weight and/or the MWD of the crosslinkable vinyl oligomer(s). It may therefore be desirable to add a chain transfer agent to the free radical polymerisation process or to use high levels of initiator, typically above 1% by weight, more preferably above 2% by weight more preferably above 3.5% by weight of vinyl monomer(s) to give the desired low molecular weight. Conventional chain transfer agents may be utilised and include mercaptans, sulphides, disulphides, triethylamine and halocarbons. In some instances chain transfer to the monomer(s) or chain transfer to solvents (e.g. toluene) during the polymerisation is capable of reducing the molecular weight to the desired value. Examples include polymerisations in which α-methyl styrene or vinyl chloride are used as a comonomer. In particular however the technique known as catalytic chain transfer polymerisation (CCTP) may be used to provide low molecular weights. In this case a free radical polymerisation is carried out using a free radical forming initiator and a catalytic amount of a selected transition metal complex acting as a catalytic chain transfer agent (CCTA), and in particular a selected cobalt chelate complex. Such a technique has been described fairly extensively in the literature within the last twenty years or so. For example, various literature references, such as N. S. Enikolopyan et al, J. Polym. Chem. Ed., Vol 19, 879 (1981), discloses the use of cobalt II porphyrin complexes as chain transfer agents in free radical polymerisation, while U.S. Pat. No. 4,526,945 discloses the use of dioxime complexes of cobalt II for such a purpose. Various other publications, e.g. U.S. Pat. No. 4,680,354, EP-A-0196783, EP-A-0199436 and EP-A-0788518 describe the use of certain other types of cobalt II chelates as chain transfer agents for the production of oligomers of olefinically unsaturated monomers by free-radical polymerisation. WO-A-87/03605 on the other hand claims the use of certain cobalt III chelate complexes for such a purpose, as well as the use of certain chelate complexes of other metals such as iridium and rhenium.

The use of catalytic chain transfer agents provide 3 important benefits:

a) very low concentrations of catalytic chain transfer agent (typically 1 to 1000ppm by weight of vinyl monomer used) are required to attain the preferred low molecular weight oligomer. In contrast, conventional chain transfer agents such as mercaptans need to be added at much higher concentrations (typically 0.5 to 7% by weight of vinyl monomer) if the desired molecular weight is to be achieved. Such high concentrations of chain transfer agent are economically unattractive and may give the final product an unacceptable odour. This unpleasant odour is very apparent in formulated wet systems and during the coating process. Even the final dry film can exhibit an unpleasant odour. In contrast when the crosslinkable vinyl oligomer(s) is prepared using a catalytic chain transfer agent there is no odour from the chain transfer agent at any stage;

b) a vinyl oligomer(s) prepared by catalytic chain transfer polymerisation (CCTP) contains a terminal unsaturated group on many, if not every vinyl oligomer molecule. This terminal unsaturation can participate in autoxidation reactions for example in fatty acid crosslinking systems. Thus the crosslinkable vinyl oligomer(s) of the present invention could have autoxidisable crosslinker groups comprising the unsaturated groups from fatty acids as well as terminal unsaturated groups resulting from CCTP. The capability of the terminal unsaturation to participate in the autoxidative crosslinking reactions may cause the crosslinking of the vinyl oligomer(s) to be much more efficient i.e. the rate and extent of crosslinking may be increased, giving rise to a significant reduction in drying time and improvement of the mechanical properties of the final coating.

c) CCTP allows the preparation of a vinyl oligomer(s) which has a narrower PDi than is achievable by the use of conventional chain transfer agents for low Mw oligomer(s). As discussed above, low PDi favours low viscosity in the bulk and in solution (for a given Mw), which in turn leads to longer open time and wet edge time. CCTP is also particularly useful for preparing a precursor vinyl oligomer(s).

Surfactants and/or high shear can be utilised in order to assist in the dispersion of the vinyl oligomer(s) in water (even if it is self-dispersible). Suitable surfactants include but are not limited to conventional anionic, cationic and/or non-ionic surfactants and mixtures thereof such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and preferably polyethylene oxide compounds as disclosed in "non-ionic surfactants—Physical chemistry", edited by M J Schick, M. Decker 1987. The amount of surfactant used is preferably 0 to 15% by weight, more preferably 0 to 8% by weight, still more preferably 0 to 5% by weight, especially 0.1 to 3% by weight and most especially 0.3 to 2% by weight based on the weight of the crosslinkable vinyl oligomer(s).

The aqueous composition of the invention may optionally but preferably include a polymer(s) dispersed therein which is not a crosslinkable vinyl oligomer (or a non-vinyl oligomer whether crosslinkable or non-crosslinkable) and preferably has an Mw$\geq$90,000 Daltons, herein termed a "dispersed polymer" for convenience. Preferably the weight average molecular weight of the dispersed polymer(s) in the aqueous polymer dispersion is in the range of from 100,000 to 6,000,000, more preferably in the range of from 150,000 to 2,000,000, and especially in the range of from 250,000 to 1,500,000 Daltons. If the dispersed polymer(s) is fully precrosslinked its Mw will be infinite. The Mw of the dispersed polymer(s) may be <90,000 Daltons, with the proviso that the solution viscosity of the dispersed polymer(s) is >150 Pa·s as determined from a 80% by weight solids solution of the dispersed polymer(s) in at least one of the solvents selected from the group consisting of N-methylpyrrolidone, n-butyl glycol and mixtures thereof, using a shear rate of 90±5 $s^{-1}$ and at 50±2° C.

Preferably, the solution viscosity (if measurable) of the dispersed polymer(s) when used in the aqueous composition of the invention is $\geq$250 Pa·s, more preferably $\geq$500 Pa·s, and especially $\geq$1000 Pa·s as determined from a 80% by weight solids solution of the dispersed polymer(s) in at least one of the solvents, selected from the group consisting of N-methylpyrrolidone, n-butylglycol and mixtures thereof at a shear rate of 90±5 $s^{-1}$ and at 50±2° C.

The solution viscosity of the dispersed polymer(s) may not be measurable if for example the weight average molecular is so high as to render the dispersed polymer(s) insoluble in organic solvents or if the dispersed polymer(s) is fully or partially cross linked, again rendering it insoluble.

The dispersed polymer(s) may be film forming or non-film forming at ambient temperature; preferably the dispersed polymer(s) is non-film forming at ambient temperature. Preferably the aqueous composition of the invention does include such a dispersed polymer(s).

The crosslinkable vinyl oligomer(s) can thus be (and preferably is) combined with a dispersed polymer(s) to further improve the provision of a binder system for providing an aqueous composition with the desired balance of long open/wet edge time and a reduced tack free time.

The presence of the crosslinkable vinyl oligomer(s) (as discussed above) provides the defined long open time and wet edge time, whilst the presence of the dispersed polymer(s) (e.g. in the form of a polymer latex) appears to assist in reducing the drying time of the composition, even though its presence may not always be essential to achieve the broadest scope of defined requirements in this respect.

Accordingly in a further, and preferred, embodiment of the present invention there is provided an aqueous coating composition as defined herein additionally comprising a dispersed polymer(s).

The dispersed polymer(s) may for example be the product of an aqueous emulsion polymerisation or a preformed polymer dispersed in water.

Preferably the dispersed polymer(s) has a measured Tg using differential scanning calorimentry (DSC) which is in the range of from −50 to 300° C., more preferably in the range of from 0 to 250° C., most preferably in the range of from 25 to 200° C. and especially in the range of from 35 to 125° C. If the dispersed polymer(s) is a vinyl polymer, the vinyl polymer may be a sequential polymer, i.e. the vinyl polymer will have more than one Tg. Especially preferred is a vinyl polymer with 10 to 50 wt. % of a soft part with a Tg in the range of from −30 to 20° C. and 50 to 90 wt. % of a hard part of with a Tg in the range of from 60 to 110° C. This combination provides an additional advantage of improved block resistance of the resultant coating, especially when co-solvent levels of 0 to 15 wt. %, more preferably 0 to 5 wt. % and most preferably 0 to 3 wt. %. of the aqueous composition are used. A simple blend of high and low Tg dispersed polymers can also be used to achieve the same or similar advantage. Blocking is the well-known phenomenon of coated substrates which are in contact tending to unacceptably adhere to each other, such as windows and doors in their respective frames, particularly when under pressure, as for example in stacked panels.

Preferably the dispersed polymer(s) has an average particle size in the range of from 25 to 1000 nm, more preferably 60 to 700 nm, more preferably 100 to 600 nm and especially in the range of from 175 to 500 nm. The dispersed polymer may also have a polymodal particle size distribution.

The dispersed polymer(s) preferably has a low solubility, measurable by the centrifuge test as described herein, in the aqueous medium of the composition of the invention. However some of the dispersed polymer(s) may be soluble. Preferably at least 30%, more preferably at least 60%, most preferably at least 90% of the dispersed polymer(s) is present as insoluble polymer over the whole pH range.

The dispersed polymer(s) may for example be one or more of vinyl polymer, polyurethane, polyester, polyether, polyamide, and polyepoxide. The dispersed polymer(s) may also be a hybrid of two or more different polymer types such as urethane-acrylic polymers (as described in for example U.S. Pat. No. 5,137,961), epoxy-acrylic polymers and polyester-acrylic polymers. The dispersed polymer(s) may also be an organic-inorganic hybrid, for example silica particles grafted with a vinyl polymer(s). Blends of dispersed polymers may of course also be used.

The dispersed polymer(s) optionally contains acid groups. The preferred acid value of the dispersed polymer(s) depends on the type and molecular weight of crosslinkable vinyl oligomer and (if present) the type of cosolvent used. If the crosslinkable vinyl oligomer is hydrophilic, the cosolvent (if used) is preferably also of a hydrophilic nature and thus a low acid value of the dispersed polymer(s) is preferred (preferably below 60, more preferably below 40, still more preferably below 30, especially below 24, more especially below 19 and most especially preferably below 15 mg KOH/g). If however a hydrophobic crosslinkable vinyl oligomer is used, for instance based on (at least partly) unsaturated fatty acid and without dispersing groups, the cosolvent is preferentially of a hydrophobic nature (if at all present) and therefore much higher acid values (up to an acid value of 160, most preferably up to an acid value of 125, most preferably up to an acid value of 100 mg KOH/g) of the dispersed polymer(s) may be tolerated to give the desired properties.

In a special embodiment, 0 to 15 wt. % of a co-solvent (based on total binder solids where the binder includes the crosslinkable oligomer(s), non-crosslinkable oligomer(s) and any dispersed polymer(s)) is used, where the dispersed polymer(s) has an acid value below 20 mgKOH/g and the crosslinkable vinyl oligomer(s) is present in an amount (based on total binder solids) of 35 to 65 wt. %, and the crosslinkable vinyl oligomer(s) comprising 45 to 70 wt. % of fatty acid groups.

The dispersed polymer(s) may optionally contain hydroxyl groups. If the dispersed polymer(s) is a vinyl polymer comprising polymerised (meth)acrylic monomers then preferably the hydroxyl group content in the vinyl polymer is below 1.0 wt. %, more preferably below 0.5 wt. % and most preferably below 0.2 wt. % based on the weight of the vinyl polymer.

The dispersed polymer(s) may optionally contain amide groups (such groups being for example obtainable from amide functional monomers such as (meth)acrylamide). If the dispersed polymer(s) is a vinyl polymer(s) comprising (meth)acrylamide monomers, then preferably the amide group content in the vinyl polymer is below 3.0 wt. %, more preferably below 1.5 wt. % and most preferably below 0.6 wt. % based on the weight of the vinyl polymer(s).

The dispersed polymer(s) may optionally contain wet-adhesion promoting groups such as acetoacetoxy groups, (optionally substituted) amine or urea groups, for example cyclic ureido groups, imidazole groups, pyridine groups, hydrazide or semicarbazide groups.

The dispersed polymer(s) may optionally be crosslinkable, for example the dispersed polymer(s) may contain crosslinker groups which allow independent crosslinking of the dispersed polymer(s) and/or allow participation in the crosslinking reaction of the crosslinkable vinyl oligomer(s), thus speeding up the drying rate and improving the properties of the final coating (e.g. chemical resistance and scratch resistance). Examples of such crosslinker groups include groups which can take part in the autoxidation and groups which will effect crosslinking other than by autoxidation, for example by Schiff base and silane condensation reactions as discussed above for crosslinkable vinyl oligomer(s).

In a preferred embodiment the dispersed polymer(s) contains crosslinker groups which can participate in the preferred autoxidative crosslinking reactions of an autoxidisably crosslinkable vinyl oligomer(s).

In a preferred embodiment the dispersed polymer(s) may be fully or partially pre-crosslinked (i.e. fully or partially crosslinked while present in the invention coating composition and prior to coating). If the dispersed polymer(s) is a vinyl polymer pre-crosslinking may be achieved by using polyunsaturated monomers during the vinyl polymer synthesis such as allyl methacrylate, diallyl phthalate, tripropylene glycol di(meth)acrylate, 1,4-butanediol diacrylate, trimethylol propane triacrylate, (2-dicyclopentenyloxy)ethyl (meth)acrylate and dicyclopentadiene (meth)acrylate. Allyl methacrylate is most preferred. Alternatively very low levels of initiator may be used, leading to chain-transfer to the vinyl polymer and hence to grafting and high Mw. Other ways to generate pre-crosslinking in a vinyl polymer is to include the use of monomer(s) bearing groups which may react with each other during synthesis to effect pre-crosslinking, for example glycidylmethacrylate and acrylic acid, n-methylol (meth)acrylamide, n-butylol (meth)acrylate and isobutylol (meth)acrylamide.

If the dispersed polymer(s) is a dispersed vinyl polymer(s), the vinyl polymer(s) may be prepared from for example the vinyl monomer(s) described herein for the preparation of the vinyl oligomer(s).

If the dispersed polymer(s) is a dispersed vinyl polymer, then the dispersed vinyl polymer may in some embodiments comprise at least 15 wt. %, more preferably at least 40 wt. % and most preferably at least 60 wt. % of polymerised vinyl acetate. If the vinyl polymer comprises at least 50 wt. % of polymerised vinylacetate then preferably the vinyl polymer also comprises 10–49 wt. % of either n-butylacrylate or a branched vinylester, for example Veova 10.

In preferred embodiment the dispersed vinyl polymer comprises:

I 15 to 60 wt. % of styrene and/or α-methylstyrene;

II 15 to 80 wt. % of one or more of methyl methacrylate, ethyl methacrylate, cyclohexyl(meth)acrylate, and n-butyl methacrylate;

III 0 to 5 wt. % more preferably 0 to 3.5 wt. % of a vinyl monomer containing carboxylic acid groups;

IV 0 to 10 wt. %, more preferably 0 to 5 wt. % of vinyl monomer(s) containing a non-ionic water-dispersing group(s);

V 5 to 40 wt. % of vinyl monomer(s) other than as in I to IV, VI and VII;

VI 0 to 5 wt. % of vinyl monomer(s) containing a wet-adhesion promoting group(s) or a crosslinker group(s) (excluding any within the scope of III and VII); and VII 0 to 8 wt. %, more preferably 0 to 4 wt. %, and most preferably 0.5 to 3 wt. % of polyethylenically unsaturated vinyl monomer(s), wherein I)+II) add up to at least 50 wt. % and I+II+III+IV+V+VI+VII add up to 100 wt. %.

The dispersed polymer(s) can be prepared by any known technique. Preparation techniques particularly include either dispersing a pre-formed polymer or polymer solution is in water or if the polymer is a vinyl polymer directly synthesising the vinyl polymer in water (for example by emulsion polymerisation, micro-suspension polymerisation or mini emulsion polymerisation). Methods for preparing aqueous dispersed polymer(s) are reviewed in the Journal of Coating Technology, volume 66, number 839, pages 89–105 (1995) and these methods are included herein by reference. Preferably dispersed vinyl polymer(s) are prepared by the emulsion polymerisation of free radically polymerisable olefinically unsaturated monomers (Emulsion Polymerisation and Emulsion Polymers, P. Lovell, M. S. El-Aasser, John Wiley, 1997). Any published variant of the emulsion polymerisation process may be utilised to prepare the dispersed polymer(s), including the use of seeded emulsion polymerisation techniques to control particle size and particle size distribution, especially when working in the particle size range 300–700 nm when the seeded technique is useful for giving good particle size control. Other useful techniques are the so called sequential polymerisation technique and the power feed technique (chapter 23 in "Emulsion Polymers and Emulsion Polymerisation" D R Basset and A E Hamielec, ACS Symposium Series No 165, 1981). Suitable free radically polymerisable olefinically unsaturated monomers include those described above for the preparation of vinyl oligomer(s) and any others that may be useful for preparing the dispersed polymer(s) with characteristics as described above.

Preferably the dispersed polymer(s) is colloid stable and it is also desirable that colloid stability is maintained for as long as possible into the drying process since early loss of colloid stability can bring a premature end to open time. Since the final coating composition may often contain co-solvents and dissolved ionic species (e.g. from pigment dissolution and from the presence of neutralising agents), it is desirable that the colloid stability of the aqueous dispersed polymer(s) is adequate to withstand any destabilising influences of these components. Colloid stability may be achieved by the addition of conventional non-ionic surfactants, optionally with the addition of anionic surfactants at any stage during the preparation of the aqueous composition of the invention. Strongly adsorbing surfactants capable of providing steric stability are preferred. Higher levels of colloid stability may be obtained by chemically binding or partially binding hydrophilic stabilising groups such as polyethylene oxide groups to the surface of dispersed polymer(s) particles. Suitable surfactants and stabilising groups are described in "Non Ionic Surfactants-Physical Chemistry" (M J Schick, M Dekker Inc. 1987) and "Polymer Colloids" (Buscall, Corner & Stageman, Elsevier Applied Science Publishers 1985).

Chemical binding (grafting) of hydrophilic stabilising groups onto dispersed polymer(s) particles can be achieved by the use of a comonomer, polymerisation initiator and/or chain transfer agent bearing the stabilising group, for example methoxy(polyethylene oxide)$_{30}$ methacrylate may be introduced as a comonomer into an emulsion polymerisation to give rise to stabilised dispersed polymer particles with bound polyethylene oxide groups on the particle surface. Another method of producing a strongly sterically stabilised dispersed polymer(s) is to introduce cellulosic derivatives (e.g. hydroxy ethyl cellulose) during an emulsion polymerisation (see for example D H Craig, Journal of Coatings Technology 61, no. 779, 48, 1989). Hydrophilic stabilising groups may also be introduced into a preformed polymer before it is subsequently dispersed in water, as described in EP 0317258 where polyethylene oxide groups are reacted into a polyurethane polymer which is subsequently dispersed in water and then chain extended.

The combination of crosslinkable vinyl oligomer(s) (and other crosslinkable or non-crosslinkable oligomers, if used) and dispersed polymer(s) is most conveniently prepared by physically blending the corresponding aqueous dispersions. However other methods of preparing the combination can sometimes be utilised. One such method is to prepare the crosslinkable vinyl oligomer(s) in organic solvent solution as previously discussed, and to disperse this vinyl oligomer(s) solution directly into an aqueous dispersed polymer(s). Alternatively the organic solvent can be removed from the crosslinkable vinyl oligomer(s) solution, and the dry vinyl oligomer(s) directly dispersed into an aqueous dispersed polymer(s). Another method is to introduce the crosslinkable vinyl oligomer(s) into an aqueous emulsion polymerisation reaction which produces the dispersed polymer(s). Such an introduction of crosslinkable vinyl oligomer(s) can either be at the commencement of the emulsion polymerisation or during the emulsion polymerisation. The crosslinkable vinyl oligomer(s) may also be diluted with reactive diluent (for example vinyl monomers) at any stage of its preparation and then dispersed into a dispersed polymer(s), followed by polymerisation or partial polymerisation of the reactive diluent in the presence of the aqueous vinyl oligomer(s) and the optional dispersed polymer(s). Optionally, depending on the nature of the reactive diluent, no further polymerisation of the reactive diluent prior to use in a coating may be required.

Alternatively the crosslinkable vinyl oligomer(s) and dispersed polymer(s) may be combined by preparing a redispersible dry powder form of the dispersed polymer(s), and then dispersing the redispersible dry powder directly into an aqueous dispersion of the crosslinkable vinyl oligomer(s). Methods for preparing redispersible dry powders from polymer emulsions are described for example in U.S. Pat. No. 5,962,554, DE 3323804 and EP 0398576.

Preferably the aqueous composition of the invention gives clear films on film formation after coating the aqueous composition onto a substrate. It may be that if there is some incompatibility between the vinyl oligomer(s) and the dispersed polymer(s) then one of them may coagulate on film formation resulting in a haze in the film, which may not be desirable for some applications.

Preferably the ratios by weight of solid material of crosslinkable vinyl oligomer(s) (and other crosslinkable or non-crosslinkable oligomers if used) to the dispersed polymer(s) is in the range of from 100:0 to 10:90, more preferably in the range of from 90:10 to 20:80, still more preferably in the range of from 80:20 to 30:70, and especially in the range of from 65:35 to 35:65.

The aqueous coating compositions of the invention are particularly useful when in the form of final coating formulations (i.e. composition intended for application to a substrate without any further treatment or additions thereto) such as protective, adhesive or decorative coating compositions (for example paint, lacquer or varnish) wherein an initially prepared composition may be optionally further diluted with water and/or organic solvents and/or combined with further ingredients, or may be in more concentrated form by optional evaporation of water and/or organic components of the liquid medium of an initially prepared composition. The invention composition can contain co-solvent or a mixture of co-solvents. Preferably the invention composition contains ≦18% by weight of co-solvent(s), more preferably ≦10%, more preferably ≦5%, especially ≦3%, and most especially 0% by weight based on the invention composition.

Preferably the evaporation rate of the co-solvent is ≦0.6, more preferably ≦0.15, most preferably ≦0.08 and especially ≦0.035. Values for evaporation rates were published by Texaco Chemical Company in a bulletin Solvent Data; Solvent Properties (1990). These values are relative to the evaporation rate of n-butylacetate for which the evaporation rate is defined as 1.00. Determination of evaporation rates of solvents not listed in this bulletin is as described in ASTM D3539.

In a special embodiment, the amount of co-solvent(s) used in the invention composition is preferably linked to the Mw of the crosslinkable vinyl oligomer(s) in the composition. For vinyl oligomer(s) with Mw in the range 1,000 to 40,000 Daltons, the amount of co-solvent is preferably 0 to 15 wt. % based on the weight of the composition, more preferably 0 to 10 wt %. For oligomers with Mw in the range >40,000 to 80,000 Daltons, the corresponding figures for the preferred amount of co-solvent are 0 to 25 wt. %, more preferably 5 to 20 wt. %.

Furthermore, there is also a preferred relationship between the amount of co-solvent used and the amount of binder solids (vinyl oligomer(s) plus optional dispersed polymer(s)), viz the amount of co-solvent is preferably $\leq 50$ wt. % based on the weight of binder polymer solids in the composition, more preferably $\leq 35$ wt. %, more preferably $\leq 20$ wt. %, more preferably $\leq 10$ wt. %, and especially preferably 0 wt. %.

An advantage of the present invention is that co-solvent can, if as is often required for environmental and safety reasons, be present at a very low concentrations because of the plasticising nature of the crosslinkable vinyl oligomer(s). Preferably the co-solvent(s) to water ratio is below 1.0, more preferably below 0.5, more preferably below 0.3 and especially below 0.15. The co-solvent(s) can all be added at the final formulation step. Alternatively some or all of the co-solvent in the final formulation can be the cosolvent utilised in a solution polymerisation to prepare the crosslinkable vinyl oligomer(s) (or its precursor oligomer(s)). An important consideration when choosing a co-solvent is whether or not it is compatible with the crosslinkable vinyl oligomer(s) and/or the dispersed polymer(s) and the effect of any co-solvent partitioning (and the partitioning of the co-solvent in the (aqueous) oligomer phase versus the dispersed polymer particles is preferably >1/1, more preferably >2/1 and most preferably >3/1. If the co-solvent is more compatible with the dispersed polymer it will swell the polymer, thus increasing the overall viscosity. Preferably any co-solvent present in the aqueous composition of the invention is more compatible with the vinyl oligomer(s) than with the dispersed polymer(s), so that the dispersed polymer(s) undergoes little if any swelling by the co-solvent. The co-solvent selection is often determined by experimentation and/or by the use of a solubility parameter concept i.e. maximising the difference in the solubility parameter of the dispersed polymer(s) and solvent leads to a minimisation of the co-solvent uptake by the dispersed polymer(s). Solubility parameters of a range of solvents and a group contribution method for assessing the solubility parameters of polymers are given by E A Grulke in the "Polymer Handbook" (John Wiley pages 519–559,1989) and by D W Van Krevelen and P J Hoftyzer in "Properties of Polymers. Correlations With Chemical Structure" (Elsevier, N.Y., 1972 chapters 6 and 8). Co-solvent uptake of the dispersed polymer(s) may also be decreased by increasing its Tg so that the dispersed polymer(s) is in the glassy region at ambient temperature, or by pre-crosslinking the dispersed polymer(s) as described above. Other ways of introducing pre-cross linking into dispersed polymer(s) are known in the art, for example U.S. Pat. No. 5,169,895 describes the preparation of pre-crosslinked polyurethane aqueous dispersions by the use of tri-functional isocyanates in the synthesis.

Optionally external crosslinking agent(s) may be added to the aqueous composition of the invention to aid crosslinking during or after drying. Examples of reactive functional groups which may be utilised for external crosslinking agent(s) include but are not limited to hydroxyl functional groups reacting with isocyanate (optionally blocked), melamine or glycouril functional groups; keto, aldehyde and/or acetoacetoxy carbonyl functional groups reacting with amine or hydrazine functional groups; carboxyl functional groups reacting with aziridine, epoxy or carbodiimide functional groups; silane functional groups reacting with silane functional groups; epoxy functional groups reacting with amine or mercaptane groups as well as carboxyl functional groups undergoing metal ion (such as zinc) crosslinking.

A known problem with many autoxidisable coating compositions is that the resultant coatings have a tendency to yellow, in particular where the autoxidisable groups are derived from polyunsaturated fatty acids, such as for example tung oil fatty acid, linolenic acid, eleostearic acid, arachidonic acid, clupanadonic acid, and fatty acids obtainable from dehydrated castor oil. This may be unacceptable depending on the desired colour of the resultant coating. Preferably the aqueous composition has a starting yellowness value of less than 10, more preferably less than 7 and most preferably less than 4, measured as described herein. Preferably the aqueous composition has an increase in yellowing in darkness of less than 7, more preferably less than 5, most preferably less than 3 and preferably the aqueous composition has an increase in yellowing in daylight of less than 4, more preferably less than 3 and most preferably less than 2 as measured by the test method described herein. Furthermore, the absolute yellowness (i.e. yellowness at start plus yellowness due to ageing) of the aqueous composition is preferably less than 12, more preferably less than 10, still more preferably less then 8, and most preferably less than 6.

In a further embodiment of the present invention there is provided an aqueous coating composition as defined herein comprising:

i) 3 to 26% of a crosslinkable oligomer(s) by weight of the composition of which at least 52 wt % is a crosslinkable water-dispersible vinyl oligomer(s);

ii) 0 to 6.5% of a non-crosslinkable oligomer(s) by weight of the composition;

iii) 10 to 56% of dispersed polymer(s) by weight of the composition;

iv) 0 to 15% of co-solvent by weight of the composition;

v) 5 to 65% of water by weight of the composition;

where i)+ii)+iii)+iv)+v)=100%.

In another embodiment of the present invention there is provided an aqueous coating composition as defined herein comprising:

i) 15 to 40% of a crosslinkable oligomer(s) by weight of crosslinkable oligomer(s), non-crosslinkable oligomer(s) and dispersed polymer(s) of which at least 52 wt % is a crosslinkable water-dispersible vinyl oligomer(s);

ii) 0 to 10% of a non-crosslinkable oligomer(s) by weight of crosslinkable oligomer(s), non-crosslinkable oligomer(s) and dispersed polymer(s);

iii) 50 to 85% of dispersed polymer(s) by weight of crosslinkable oligomer(s), non-crosslinkable oligomer(s) and dispersed polymer(s);

where i)+ii)+iii)=100%.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings such as decorative paints on wood and board substrates. The aqueous carrier medium is removed by natural drying or accelerated drying (by applying heat) to form a coating.

Accordingly, in a further embodiment of the invention there is provided a coating obtainable from an aqueous coating composition of the present invention.

The aqueous coating composition of the invention may contain conventional ingredients, some of which have been mentioned above; examples include pigments, dyes, emulsifiers, surfactants, plasticisers, thickeners, heat stabilisers, levelling agents, anti-cratering agents, fillers, sedimentation inhibitors, UV absorbers, antioxidants, dispersants, flow agents, adhesion promoters, crosslinking agents, de-foamers, co-solvents, wetting agents and the like introduced at any stage of the production process or subsequently. It is possible to include an amount of antimony oxide in the dispersions to enhance the fire retardant properties.

In particular, the aqueous coating compositions of the invention (if autoxidisable) and formulations containing them advantageously include a drier salt(s). Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salt(s) in the composition is typically that to provide an amount of metal(s) within the range of from 0.01 to 0.5% by weight based on the weight of autoxidisable vinyl oligomer(s) and autoxidisable dispersed polymer(s).

Drier salts are conventionally supplied as solutions in white spirit for use in solvent-borne alkyd systems. They may, however, be used quite satisfactorily in aqueous coating compositions since they can normally be dispersed in such systems fairly easily. The drier salt(s) may be incorporated into the aqueous coating composition at any convenient stage. For example the drier salt(s) may be added prior to dispersion into water. Drier accelerators may be added to the drier salts. Suitable drier accelerators include 2,2'-bipyridyl and 1,10-phenanthroline.

If desired the aqueous coating composition of the invention can be used in combination with other polymer dispersions or solutions which are not according to the invention.

The solids content of the aqueous coating composition of the invention is preferably ≧15 wt %, more preferable ≧25 wt %, still more preferably ≧35 wt %, especially ≧40 wt % more especially ≧45 wt % and most especially ≧50 wt %. The upper limit of solids content is usually not more than 90 wt %, more preferably not more then 80 wt %.

FIG. 1 shows the drying profile measured using a shear rate of $0.0997\ s^{-1}$.

FIG. 2 shows the drying profile measured using a shear rate of $0.990\ s^{-1}$.

FIG. 3 shows the drying profile measured using a shear rate of $9.97\ s^{-1}$.

FIG. 4 shows the drying profile measured using a shear rate of $78.6\ s^{-1}$.

Figure 1:
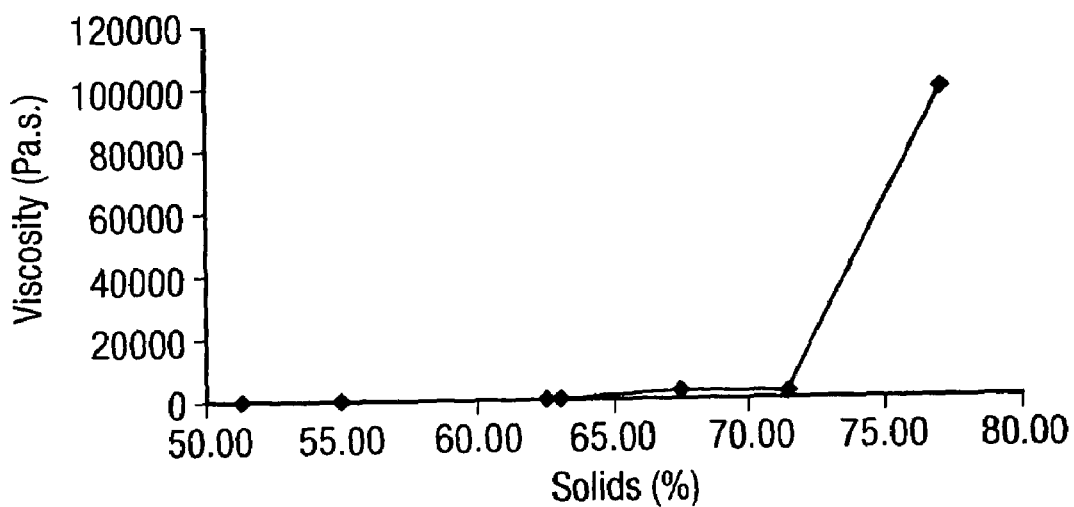
FIG. 1 to 4 illustrate the drying profile of a composition according to the present invention [Example 10], where the equilibrium viscosity is measured as the solids content increases.

The present invention is now illustrated by reference to the following examples. Unless otherwise specified, all parts, percentages and ratios are on a weight basis. The term "working" means that the example according to the invention. The term "non-working" means that it is not according to the invention (i.e. comparative).

Test Methods:

To test for the open time and wet edge time of the aqueous compositions prepared as described in the Examples below, the aqueous composition was applied using a wire rod to a test chart (18×24 cm, form 8B—display, available from Leneta Company) at a wet film thickness of 120 μm. Open time and wet edge time tests were performed at fairly regular time intervals according to the approximate expected final times in each case (being determined roughly from a trial run) the intervals between measurements decreasing towards the end of the run. The measurements were carried out at relative humidity levels of 50+/−5%, temperatures of 23+/−2° C. and an air flow of ≦0.1 m/s.

Open Time:

The open time was determined by brushing at regular intervals (as mentioned above) a virgin 75 cm² area of the coated chart with a brush (Monoblock no 12, pure bristles/polyester 5408–12) carrying some more of the composition with a brush pressure of 100–150 g during 30 seconds. In this time the brush was moved in one set comprising 5 times in the direction of the width of the substrate and 5 times in the direction of length of the substrate before the homogeneity of the coating was visually assessed. Once the composition carried on the brush no longer formed a homogeneous layer with the coating on the substrate the open time was considered to be over.

Wet Edge Time:

The wet edge time was determined by brushing at regular time intervals (as mentioned above) a virgin 25 cm² edge area of the coated chart with a brush (Monoblock no 12, pure bristles/polyester 5408–12) carrying some more of the composition with a brush pressure of 100–150 g during 30 seconds. In this time the brush was moved in one set comprising 5 times in the direction of the width of the substrate and 5 times in the direction of length of the substrate before the homogeneity of the coating was visually assessed. Once the composition carried on the brush no longer formed a homogeneous layer with the coating on the substrate and/or a visible lap line could be seen the wet edge time was considered to be over.

Drying Time:

To test the dust-free, tack-free and thumb-hard drying stages of the aqueous compositions prepared in the Examples described below, the composition was applied to a glass plate at a wet film thickness of 80 μm, which corresponded to a dry film thickness of about 30 μm. Drying time tests were performed at regular time intervals at relative humidity levels of 50+/−5%, temperatures of 23+/−2° C. and an air flow ≦0.1 m/s.

Dust-Free Time:

The dust-free time was determined by dropping a piece of cotton wool (about 1 cm$^3$, 0.1 g) onto the drying film from a distance of 25 cm. If the piece of cotton wool could immediately be blown from the substrate by a person without leaving any wool or marks in/on the film, the film was considered to be dust-free.

Tack-Free Time:

The tack-free time was determined by placing a piece of cotton wool (about 1 cm$^3$, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Thumb-Hard Time:

The thumb-hard was determined by placing the coated glass plate on a balance and a thumb was pressed on the substrate with a pressure of 7 kg. The thumb was then rotated 90° under this pressure. If the film was not damaged the coating was dried down to the substrate level and considered to be thumb-hard.

Viscosity Measurements:

All viscosity measurements were performed on a Bohlin Rheometer VOR or a TA Instruments AR1000N Rheometer, using the cup & spindle (C14), cone & plate (CP 5/30) and/or plate & plate (PP15) geometry, depending on the viscosity of the sample to be measured.

Solution Viscosity

For the solution viscosity measurements (both at 50±2° C. and at 23±2° C.), the cone & plate (CP 5/30) geometry was used and the measurements were performed at a shear rate of 92.5 s$^{-1}$. If the oligomer solutions were too low in viscosity to remain in between the cone and the plate, the Cup & Spindle C14 geometry was used and the viscosity measurements were performed at a shear rate of 91.9 s$^{-1}$. For both geometries, the gap between the Cone and the Plate (or between the Cup and the Spindle) was set to 0.1 mm, prior to each measurement. The solution viscosities of the oligomers were measured using the solvent systems and the conditions as defined herein in the statements of invention:

1. The 80% solids solution: The oligomer was diluted (if necessary) with the appropriate solvent to an 80% solids solution (in NMP, BG or a mixture of NMP and BG at any ratio) which was homogenised by stirring the solution for 15 minutes at 50±2° C.
2. The 70% solids solution: The oligomer was diluted with the appropriate solvent (or mixture of solvents) to result in a 70% solids solution (either in NMP/water/DMEA or in BG/water/DMEA, or in (a mixture of NMP and BG at any ratio)/water/DMEA; in both solvent mixtures the solvents should be present in a weight ratio of 20/17/3, respectively) which was homogenised by stirring the solution for 15 minutes at 50° C. The resulting solution was subsequently cooled prior to the viscosity measurement at 23±2° C.
3. A sample of oligomer solution was placed in the appropriate measurement geometry (Cone & Plate CP 5/30 or Cup & Spindle C14 geometry). The solution viscosity of the oligomer was measured at a temperature of 50±2° C. for the 80% solids oligomer solution, and at ambient temperature for the 70% solids oligomer solution. A heating/cooling unit in the measurement geometry was used to control the temperatures.

Equilibrium Viscosity

The equilibrium viscosity measurements were performed with the plate & plate geometry, with a 15 mm (P15) top-plate and a 30 mm (P30) bottom-plate. The gap between the two plates was set to 1.0 mm. All compositions were used at the solids level at which they were prepared and not diluted to lower solids levels.

Step 1: Three test charts were provided with coatings of identical film thickness. The coatings were applied with a 120 μm wire rod and the actual film thickness (and its uniformity) was checked with a wet film gauge, 20–370 μm, of Braive Instruments. The charts were dried under identical conditions in an environment where the airflow was <0.1 m/s.

Step 2: One test chart was used to determine the solids increase in time. The weight of the film was monitored in time, starting right after application of the film. After calculating the solids content at every measurement, a solids-time curve could be constructed and a trend line was calculated for the solids of the film as a function of the drying time.

Step 3: The other two test charts were used to determine the equilibrium viscosity in time: approximately every 5 minutes a sample was scraped from one test chart (in random order) and the viscosity of this sample was measured at 23° C. at representative shear rates of 0.0997 s$^{-1}$, 0.990 s$^{-1}$, 9.97 s$^{-1}$ and 78.6 s$^{-1}$. The measurements were continued for 90 minutes, unless reproducible sampling from the test charts could not be performed properly within that period of time (due to for example drying of the film to reach the dust free time).

Figure 2:
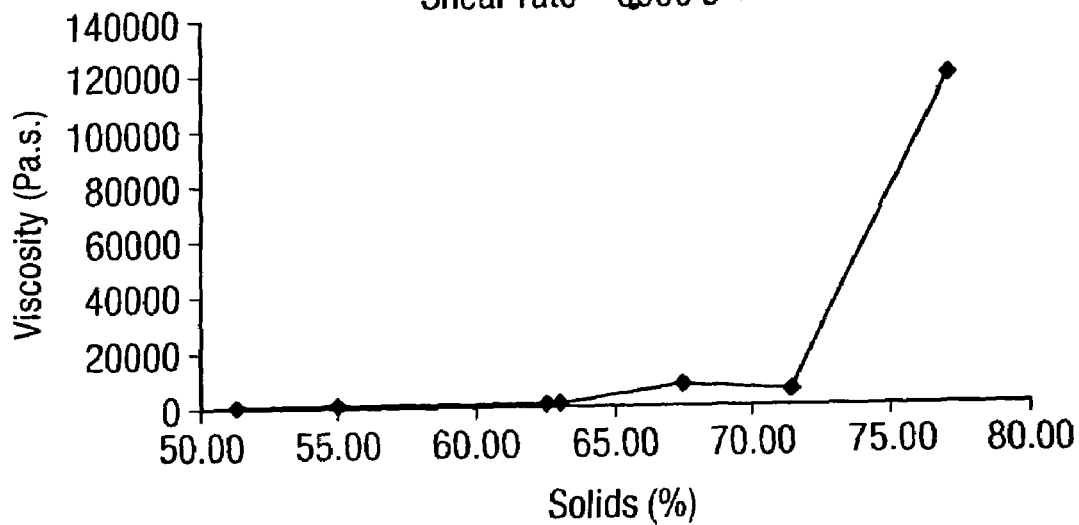
Figure 3:
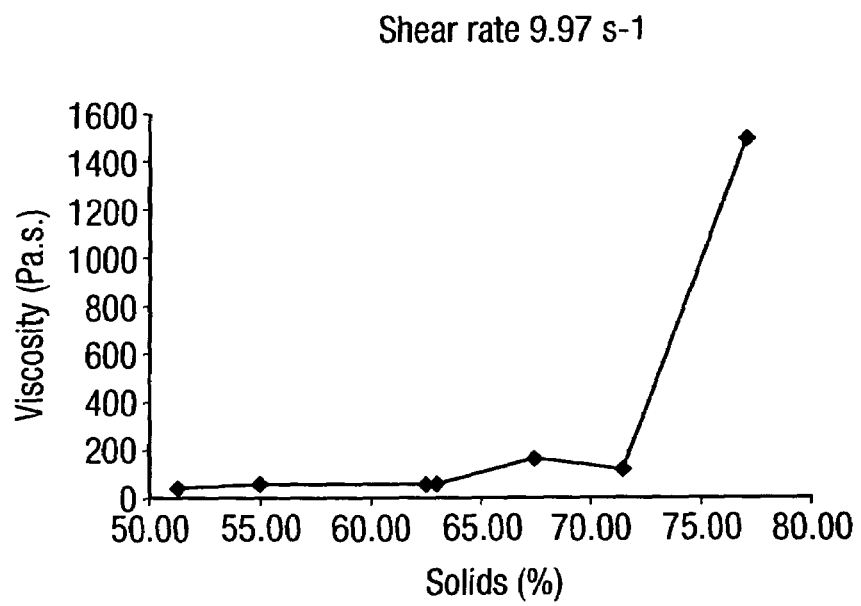
Figure 4:
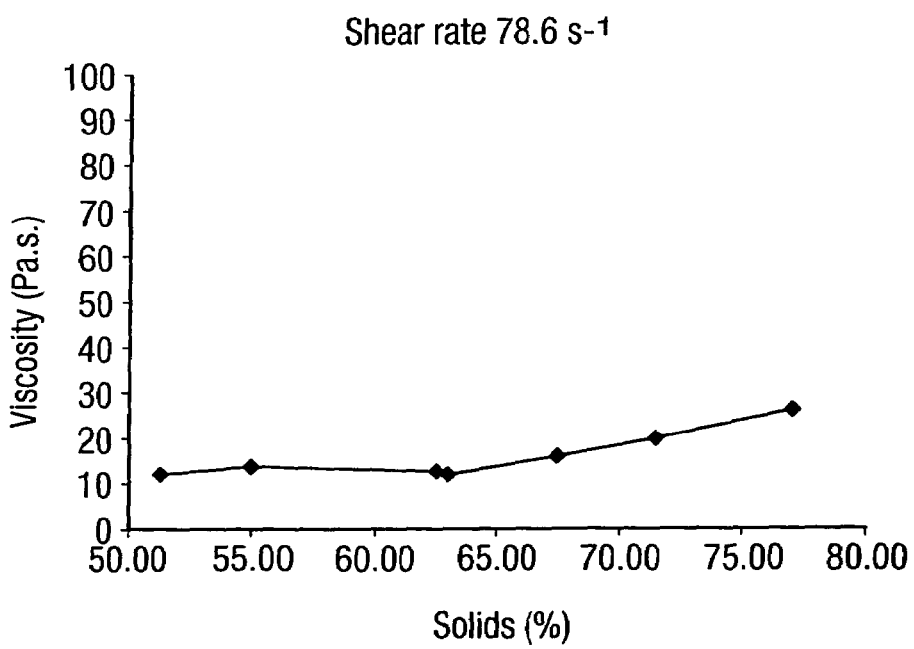

Step 4: The final drying curve of the coating as shown in FIGS. 1 to 4 (in which the equilibrium viscosity is represented as a function of the solids of the drying film) could be constructed from the solids-time curve (Step 2) and the equilibrium viscosity data (Step 3). If the equilibrium viscosity at a shear rate of 9.97 s$^{-1}$ is lower than the equilibrium viscosity at a shear rate of 0.99 s$^{-1}$, which in turn is lower than the equilibrium viscosity at a shear rate of 0.0997 s$^{-1}$, the composition may be regarded as shear thinning. If this was the case the equilibrium viscosity at 78.6 s$^{-1}$ was not always measured as it would inherently always be lower than the equilibrium viscosity at a shear rate of 9.97 s$^{-1}$.

Measurement of Yellowing:

The yellowness of a fresh coating and the increased yellowing of a coating exposed to daylight or darkness for a specified time period was determined using a Tristimulus Colorimeter consisting of a data-station, a micro-colour meter, a calibration plate with a defined x, y and z value and a printer. The equipment was calibrated to the defined values of the calibration plate and then colour co-ordinates L, a and b, were measured. The colour co-ordinates define the brightness and colour on a colour scale, is where 'a' is a measure of redness (+a) or greenness (−a) and 'b' is a measure of yellowness (+b) or blueness (−b), (the more yellow the coating, the higher the 'b' value). The co-ordinates 'a' and 'b' approach zero for neutral colours (white, grays and blacks). The higher the values for 'a' and 'b' are, the more saturated a colour is. The lightness 'L' is measured on a scale from 0 (white) to 100 (black).

The daylight-yellowing is defined as the increase of the yellowness (Δb–day) of the coating during storage at 23±2° C. and in daylight for 28 days. The dark yellowing is defined as the increase in the yellowness (Δb–dark) of the coating during storage at 23±2° C. and in the dark for 14 days.

Molecular Weight Determinations

Gel permeation chromatography (GPC) analyses for the determination of molecular weights were performed on an Alliance Waters 2690 GPC with two consecutive PL-gel columns (type Mixed-C, I/d=300/7.5 mm) using tetrahydrofuran (THF) as the eluent at 1 cm$^3$/min and using an Alliance Waters 2410 refractive index detector. A set of polystyrene standards (analysed according to DIN 55672) was used to calibrate the GPC.

Samples corresponding to about 16 mg of solid material were dissolved in 8 cm$^3$ of THF, and the mixtures were stirred until the samples dissolved. The samples were left undisturbed for at least 24 hours for complete "uncoiling" and subsequently were filtered (Gelman Acrodisc 13 to 25 mm ø CR PTFE; 0.45 µm) and placed on the auto-sampling unit of the GPC.

All species with a molecular weight less than 1000 Daltons are ignored when calculating the Mw and PDi for the oligomers. When Daltons are used in this application to give molecular weight data, it should be understood that this is not a true molecular weight, but a molecular weight measured against polystyrene standards as described above.

Water Solubility

The determination of the water solubility of crosslinkable vinyl oligomers was determined as follows:

A sample of a crosslinkable vinyl oligomer was dispersed in water and diluted with water/ammonia to 10% solids and the pH adjusted to the desired pH, within a range of from 2 to 10, and the dispersion was then centrifuged over 5 hours at 21000 rpm at 23±2° C. on a Sigma 3K30 centrifuge (21,000 rpm corresponds to a centrifugal force of 40,000 g). The pH chosen should be the pH where the crosslinkable vinyl oligomer is expected to be most soluble, for example often a pH of about 9 is suitable for anionic stabilised dispersions and a pH or about 2 is often suitable for cationic stabilised dispersions. After centrifugation a sample of the supernatant liquid was taken and evaporated for 1 hour at 105° C. to determine the solids content of the supernatant liquid. The water solubility percentage was calculated by dividing the amount of solids (g) of the supernatant by the total of amount of solids in the sample and multiplying by 100.

Water Spot Resistance Test

A coating of the examples prepared below (100 µm thick (wet)) was applied onto a Leneta 9 Chart. The coating was allowed to dry for 1 hour at ambient temperature followed by 16 hours at 60° C. Then 1 cm$^3$ of water was deposited onto the coating and covered with a watch glass. After 16 hours the glass was removed and the water drop was wiped off and the coating was examined for disfiguration.

Ammonia Spot Resistance Test 1 cm$^3$ of a 12.5% ammonia solution was applied to a coating prepared as described for the water spot test method. After 5 minutes the coating was examined for disfiguration.

Sandability

Sandability corresponds to the hardness of a coating at the point when a coating can be sanded properly. The composition prepared in the Examples described below was applied to a piece of wood at a wet film thickness of 120 µm. The coating was abraded by hand with sandpaper (grain delicacy P150) at regular time intervals at relative humidity levels of 50+/−5%, temperatures of 23+/−2° C. and an air flow ≦0.1 m/s. When there was no significant clogging (or the coating started powdering) the coating was considered to be sandable.

| Materials & Abbreviations used: | |
|---|---|
| DEA = | N,N-diethylethanolamine |
| MPEG750 = | methoxypolyethylene glycol (Mn approximately 750) |
| DMPA = | dimethylolpropionic acid |
| MPEG350 = | methoxy polyethylene glycol (Mn approximately 350) |
| NMP = | N-methyl pyrrolidone |
| TDI = | toluene diisocyanate |
| Dowanol DPM = | dipropylene glycol monomethyl ether |
| DAPRO5005 = | drier salt available from Profiltra |
| 1,4-CHDM = | 1,4-cyclohexanedimethanol |
| Voranol P-400 = | polypropyleneglycol available from DOW Chemical |
| Dedico 5981 = | dehydrated caster oil available from Uniqema |
| DMEA = | N,N-dimethyl ethanol amine |
| DMBA = | dimethylbenzylamine |
| IPDI = | isophorone diisocyanate |
| TEA = | triethylamine |
| Nouracid LE80 = | linseed oil fatty acid available from AKZO Nobel |
| Fastcat 2005 = | tin(II)chloride available from Elf-Atochem |
| Atlas 4809 = | Alkyl phenol alkoxylate available from ATLAS Chemie |
| Atpol E5720/20 = | Fatty alcohol ethoxylate available from Uniqema |
| AP = | ammonium persulphate |
| Aerosol OT-75 = | Sodium dioctylsulphosuccinate available from Cytec |
| MMA = | methylmethacrylate |
| EMA = | ethylmethacrylate |
| IBMA = | isobutylmethacrylate |
| DAAM = | diacetoneacrylamide |
| n-BA = | n-butylacrylate |
| AA = | acrylic acid |
| SLS = | Sodium Lauryl Sulphate |
| Akyposal NAF = | Sodium dodecylbenzenesulphonate available from KAO Chemicals |
| Natrosol 250LR = | Hydroxy ethyl cellulose available from Hercules |
| Akyporox OP-250V = | Octyl phenol ethoxylate available from KAO Chemicals |
| Surfactant = | Phosphate ester of nonyl phenol ethoxylate available from KAO Chemicals |
| VeoVa 10 = | Vinyl ester of versatic acid available from Shell |
| Desmodur W = | dicyclohexyl methane diisocyanate available from Bayer |
| Priplast 3192 = | Dimeric acid polyester polyol available from Uniqema |
| BMA = | n-butyl methacrylate |
| t-BHPO = | t-butyl hydroperoxide |
| Fe$^{III}$.EDTA = | ferric ethylene diamine tetracetic acid |
| IAA = | isoascorbic acid solution |
| STY = | Styrene |
| 2-EHA = | 2-Ethylhexylacrylate |
| Dynasilan MEMO = | 3-Methacryloxypropyltrimethoxysilane available from Degussa |
| HEMA = | Hydroxyethylmethacrylate |
| tEGDMA = | Triethyleneglycoldimethacrylate |
| OMKT = | n-octyl mercaptane |
| TAPEH = | tert-amylperoxy-2-ethyl hexanoate |
| Silquest A.174NT = | γ-methacroyloxypropyl trimethoxysilane available from Witco |
| Water = | demineralised water |
| PW602 = | transparent red iron oxide pigment dispersion available from Johnson Matthey |

Preparation of Fatty Acid Functional Vinyl Oligomer V1 by CCTP

A 2L 3-necked round bottom reactor, equipped with stirrer and N2 inlet, was loaded with toluene (310.5 gram), glycidyl methacrylate (90 gram), MPEG methacrylate (60 gram), n-butyl methacrylate (100 gram), methyl methacrylate (50 gram), a Co catalyst (75 ppm) and azo-isobutyronitrile (AIBN, 3.0 gram). The reaction mixture was flushed with nitrogen and the temperature was brought to 75° C. This temperature was maintained during 3 hours after which an additional amount of AIBN (0.75 gram) was added and the mixture was kept at 75° C. for 30 minutes after which the temperature was raised to 95° C. for 30 minutes. To this vinyl oligomer precursor solution Nouracid LE80 (169.40 gram) and dimethybenzylamine (DMBA; 0.60 gram) were added and the resulting yellowish mixture was heated at 140° C. under a positive nitrogen flow with no cooling In addition the crosslinkable vinyl oligomer V5 was prepared by first reacting allylamine with the GMA functional precursor oligomer at 45° C. during 8 hours after which the remaining epoxide rings were reacted with Dedico 5981 at 140° C. as described for oligomer V2.

TABLE 1

| Composition (g) | V3 | V4 | V5 | V6 | V7 | V8 |
|---|---|---|---|---|---|---|
| GMA | 90.00 | 0.00 | 35.38 | 90.00 | 135.00 | — |
| type MPEG MA | 550 | 550 | — | 550 | 550 | 350 |
| MPEG MA | 60.00 | 45.00 | — | 60.00 | 75.00 | 30.00 |
| MMA | 60.00 | — | 58.96 | 45.00 | — | — |
| BMA | 60.00 | — | 58.96 | 45.00 | — | 190.00 |
| Silquest A-174NT | — | 30.00 | — | — | — | — |
| MA | — | — | — | 60.00 | — | — |
| 2-EHA | — | — | — | — | — | 35.00 |
| IBMA | — | 105.00 | — | — | 45.00 | — |
| BA | — | — | — | — | 45.00 | — |
| DAAM | 10.00 | — | — | — | — | 45.00 |
| EMA | — | 120.00 | — | — | — | — |
| OMKT | 15.00 | 15.00 | 5.90 | 15.00 | 15.00 | 7.50 |
| TAPEH | 3.00 | 3.00 | 1.18 | 3.00 | 3.00 | 3.00 |
| Toluene | 318.00 | 318.00 | 125.00 | 318.00 | 318.00 | 310.50 |
| DMBA | 0.60 | — | 0.10 | 0.60 | 0.90 | — |
| type fatty acid | Dedico 5981 | — | Dedico 5981 | Dedico 5981 | NourAcid LE80 | — |
| fatty acid | 163.70 | — | 29.00 | 163.70 | 239.60 | — |
| allyl amine | — | — | 6.00 | — | — | — |
| Solution viscosity* | 57 | 94 | 228 | 74 | 49 | 36 |
| Solution viscosity** | 142 | 307 | 480 | 211 | 118 | 89 |
| Mw | 9892 | 8941 | 10243 | 14346 | 13194 | 11899 |
| PDi | 4.41 | 2.36 | 4.20 | 2.28 | 1.77 | 2.00 |
| water solubility (%) | 2.1 | 1.7 | 0.1 | 0.2 | 0.9 | 4.9 |

*80% solids in NMP or BG at 91.9 $s^{-1}$ (mPa · s) and at 50° C.
**70% solids in BG/H$_2$O/DMEA at 91.9 $s^{-1}$ (mPa · s) and at 23° C.

applied. The reaction was continued until the acid value reached 3.9 mg KOH/gram. The resulting vinyl oligomer V1 was at 100% solids. Vinyl oligomer V1 had a Mn of 3623, Mw of 11408 and a PDi of 3.15, a water solubility of 3.9% and the solution viscosity at 50° C. of a 80% solution in n-butylglycol, at a shear rate of 91.9s$^{-1}$ was 583 mPa·s and at 23° C. of a 70% solution in n-butylglycol/water/DMEA (20/7/3), at a shear rate of 91.9s$^{-1}$ was 290 mPa·s.

Preparation of Fatty Acid Functional Vinyl Oligomer V2

A 2L 3-necked round bottom reactor, equipped with stirrer and N$_2$ inlet, was loaded with toluene (310.5 gram), glycidyl methacrylate (90 gram), MPEG350 methacrylate (60 gram), n-butyl methacrylate (100 gram), methyl methacrylate (50 gram), n-octylmercaptane (OMKT, 7.5 gram) and tert-amylperoxy-2-ethylhexanoate (tAPEH, 3.0 gram). The reaction mixture was flushed with nitrogen and the temperature was brought to 80° C. This temperature was maintained for 3 hours after which the temperature was raised to 110° C. for 60 minutes. Next, to this mixture NourAcidLE80 (169.40 gram) and dimethybenzylamine (DMBA; 0.60 gram) were added and the resulting mixture was heated at 140° C. under a positive nitrogen flow. The reaction was continued until the acid value reached 5.1 mg KOH/gram. The resulting vinyl oligomer V2 was at 100% solids. Vinyl oligomer V2 had a Mw of 15,801 a PDi of 2.31, a water solubility of 3.9% and the solution viscosity at 50° C. of a 80% solution in n-butylglycol, at a shear rate of 91.9s$^{-1}$ was 18 mPa·s and at 23° C. of a 70% solution in n-butylglycol/water/DMEA (20/7/3), at a shear rate of 91.9s$^{-1}$ was 54 mPa·s The crosslinkable vinyl oligomers V3 to V8 were prepared according the above procedure using the components listed in Table 1 below.

Preparation of the Fatty Acid Functional Vinyl Oligomer Dispersion dV1

A 1L 3-necked round bottom flask, equipped with stirrer and N$_2$-inlet, was loaded the fatty acid functional vinyl oligomer V1 (40.0 g) in a nitrogen atmosphere. Under stirring, N-methylpyrrolidone (8.0 g), Dowanol DPm (5.0 g), Dapro 5005 (0.67 g), DMEA (3 g), Atlas G5000 (1.35 g) and water (56.7 g) were added. The dispersion was stirred for 30 min at ambient temperature and then stored under nitrogen. The resulting fatty acid functional vinyl oligomer dispersion had a pH of 10.3, and a solids content of 40.0%.

The fatty acid functional vinyl oligomer dispersions dV2 to dV8 were prepared using the method described above for dV1 using the components listed in Table 2.

TABLE 2

| Oligomer dispersion | dV2 | dV3 | dV4 | dV5 | dV6 | dV7 | dV8 |
|---|---|---|---|---|---|---|---|
| Oligomer code | V2 | V3 | V4 | V5 | V6 | V7 | V8 |
| Oligomer amount (g) | 12.5 | 10 | 20 | 12.5 | 20 | 3.75 | 12.5 |
| NMP (g) | 2.50 | 2.00 | 4.00 | 7.50 | 4.00 | 2.25 | 2.5 |
| DPM (g) | 1.56 | 1.25 | 2.50 | 4.68 | 2.50 | 1.41 | 1.56 |
| Dapro 5005 (g) | 0.15 | 0.12 | 0.23 | 0.15 | 0.23 | 0.04 | 0.21 |
| DMEA (g) | 3.00 | 3.00 | 3.00 | 3.00 | 3.00 | 3.00 | 3.00 |
| Water (g) | 30.14 | 23.45 | 50.20 | 22.02 | 50.20 | 4.29 | 30.23 |
| Dispersion solids wt % | 25.1 | 25.1 | 25.0 | 25.1 | 25.0 | 25.4 | 25.0 |
| pH | 10.1 | 10.2 | 10.1 | 10.4 | 10.2 | 10.4 | 10.2 |

Preparation of Self-Crosslinkable (Autoxidisable) Urethane Oligomer U1, and Its Dispersion dU1

Stage 1—Preparation of an Alkyd Polyol Mixture 1

A 2-L round bottom flask, equipped with a stirrer and a thermometer, was loaded with DEA (247.56 g) and NaOMe (2.54 g). The mixture was heated to 100° C. until the NaOMe was dissolved. Then sunflower oil (1248.08 g) was added giving a hazy reaction mixture. Stirring the hazy reaction mixture at 100 to 110° C. was continued until a clear reaction mixture was obtained and a DEA-conversion of at least 85% was achieved, as determined by titration of residual amine functionality in the product with aqueous HCl. A conversion of 94% was achieved. The resulting mixture was then cooled to 70° C. before adding $H_3PO_4$ (1.81 g) and stirring for 15 minutes. The product mixture was cooled to room temperature and stored under nitrogen.

Stage 2

A 1-L 3-necked round bottom flask, equipped with a stirrer and a thermometer, was loaded with DMPA (19.36 g), NMP (92.5 g), 1,4-CHDM (8.97 g), MPEG750 (18.87 g) and the alkyd polyol mixture 1 (260.43 g) in a nitrogen atmosphere. The reaction mixture was stirred until a clear solution was obtained. At a maximum temperature of 25° C. TDI (99.89 g) was fed into this reaction mixture without exceeding a reactor temperature of 50° C. After the TDI-feed was complete, the reaction mixture was heated to 80° C. and stirred at this temperature for 1 hour. The resultant alkyd urethane oligomer was then cooled to about 70° C., and diluted with Dowanol DPM (51.38 g). Subsequently DMEA (10.27 g) followed by the drying salt DAPRO5005 (5.84 g) was added and the mixture was stirred for 15 minutes. Then water (155.43 g) was added and the temperature was lowered to 55–60° C. The resultant predispersion was stirred for an additional 15 minutes. Part of the resultant predispersion (600 g), at 55–60° C., was dispersed in water (752.88 g; 45–50° C.), over 60 minutes and under a nitrogen atmosphere. While the predispersion is being dispersed, the temperature of the water phase was 45–50° C. After the addition was complete, the final dispersion was stirred for an additional 15 minutes, cooled to ambient temperature, filtered over a 200-mesh sieve and stored under nitrogen. The dispersion had a solids content of 25 wt %, a pH of 6.9 and viscosity of 200 (mPa·s).

The viscosity of a 80% solids solution of U1 in NMP (50° C., shear rate $92.5s^{-1}$) is 10.9 Pa·s.

The viscosity of a 70% solids solution of U1 in NMP/ $H_2O$/DMEA (20/7/3) (23° C., shear rate 92.5 $s^{-1}$) is 6.6 Pa·s.

GPC analysis of U1: Mw=4917; PDi=1.94

Preparation of the Non-Crosslinkable Urethane Oligomer U2, and its Dispersion dU2

In a nitrogen atmosphere, a 1-L 3-necked round bottom flask, equipped with a stirrer and a thermometer, was loaded with dimethylolpropanoic acid (DMPA; 48.00 g), N-methyl pyrrolidone (NMP; 240.00 g), methoxypolyethylene glycol (MPEG750; 19.20 g) and polypropylene glycol (Voranol P400, trademark from Dow Chemical; 618.64 g). At 50° C., toluene diisocyanate (TDI; 274.16 g) was fed into this polyol mixture while the contents of the reactor were stirred. After the TDI-feed was complete, the reaction mixture was heated to 80° C. and stirred at this temperature for 1 hour. The resultant NCO-free urethane oligomer U2 was then cooled to 70° C.

A portion of this urethane oligomer (949.80 g) was diluted with dipropylene glycol monomethyl ether (97.60 g) and N,N-dimethylethanolamine (DMEA; 25.51 g) at 60° C. and the resulting mixture was stirred for 15 min at this temperature. Then hot water was added (50° C.; 295.25 g) and the resulting predispersion was stirred for an additional 15 min at 55 to 60° C. A portion of 1100.00 g of this mixture was subsequently fed into water (919.97 g; 50° C.) in a separate reactor over a period of 60 minutes in a nitrogen atmosphere. After complete addition, the final dispersion was stirred for an additional 15 minutes at 45 to 50° C., then cooled to ambient temperature, filtered and stored under nitrogen. The dispersion dU2 has a solids content of 24.2%.

The viscosity of an 80% solids solution of U2 in NMP (50° C., shear rate $91.1s^{-1}$) is 57 Pa·s.

The viscosity of a 70% solids solution of U2 in NMP/ $H_2O$/DMEA (20/7/3) (23° C., shear rate 91.9 $s^{-1}$) is 36.7 Pa·s.

GPC analysis of U2: Mw=10,251; Mn=4,476; PDi=2.29

Preparation of Dispersed Vinyl Polymer P1

A 2-L 3-necked round bottom glass reactor, equipped with stirrer, thermometer vortex breakers and was loaded with demineralised water (652.57 g), Atpol E5720/20 (4.99 g) and Borax.10H2O (3.57 g) in a nitrogen atmosphere. The mixture was heated whilst stirring to 80° C. and then a solution of AP (2.31 g) in demineralised water (16.00 g) was added. In a dropping funnel a pre-emulsion was prepared by stirring a mixture of demineralised water (161.87 g), Atpol E5720/20 (94.85 g), Aerosol OT-75 (7.20 g), Borax.10H2O (1.07 g), MMA (534.18 g), n-BA (444.32 g) and AA (19.97 g). 5% of this pre-emulsion was added to the reactor at 80° C. over 5 minutes. The remainder was fed into the reactor over 160 minutes at 85° C. A solution of AP (0.53 g) in demineralised water (7.88 g) was added to the reactor during the first 15 minutes of feeding the pre-emulsified feed. Then the reactor content was kept at 85° C. for 30 minutes, and then cooled to ambient temperature. The pH was adjusted to 8 to 8.5 with 12.5% aqueous ammonia. The resultant product (P1) was filtered and collected.

The properties of P1 are listed in Table 4.

Preparation of a Sequential Dispersed Vinyl Polymer P2

A 2-L 3-necked round bottom glass reactor, equipped with stirrer, thermometer and vortex breakers, was loaded with demineralised water (990.94 g), SLS (30%, 0.55 g) and $NaHCO_3$, (4.44 g) in a nitrogen atmosphere. The mixture was heated whilst stirring to 80° C. and then a solution of AP (0.89 g) in demineralised water (5.00 g) was added. In a dropping funnel a monomer mixture was prepared by stirring MMA (140.48 g), n-BA (207.71 g) and AA (7.11 g). 10% of this mixture was added to the reactor at 80° C. The remainder was fed into the reactor over a period of 40 minutes at 85° C. The content of a separate dropping funnel, containing demineralised water (20.00 g), AP (0.36 g) and SLS 30% (11.62 g) was added in the same time. The reactor content was kept at 85° C. for 30 minutes. A second monomer mixture was prepared in a dropping funnel consisting MMA (464.91 g), n-BA (57.37 g) and AA (10.66 g). The mixture was fed to the reactor after the 30 minutes period in 60 minutes. The content of a separate dropping funnel, containing demineralised water (30.00 g), AP (0.53 g) and SLS 30% (17.44 g) was added in the same time. The reactor content was kept at 85° C. for 45 minutes and then cooled to ambient temperature. The pH was adjusted to 8 to 8.5 with 12.5% aqueous ammonia. The resultant product P2 was filtered and collected.

The properties of P2 are listed in Table 4.

Preparation of Dispersed Vinyl Polymer P3

A 2-L 3-necked round bottom glass reactor, equipped with stirrer, thermometer and vortex breakers, was loaded with demineralised water (194.50 g), Akyposal NAF (3.00 g), Borax.10H2O (1.25 g), Acetic acid (0.50 g) and Natrosol 250LR (10.00 g) in a nitrogen atmosphere. The mixture was heated whilst stirring to 60° C. and then a solution of AP (0.50 g) in demineralised water (10.00 g) was added. In a dropping funnel a pre-emulsion was prepared by stirring with demineralised water (171.71 g), Akyposal NAF (3.00), Borax.10H2O (1.25 g), Acetic acid (0.50 g) and Akyporox OP-250V (14.29 g) followed by VeoVa 10 (125.00 g) and vinyl acetate (375.00 g). 10% of this mixture was added to the reactor at 60° C. The mixture was heated whilst stirring to 80° C. The remainder was fed into the reactor over 90 minutes at 80° C. The content of a separate dropping funnel, containing a solution of AP (1.15 g) in demineralised water (60.00 g), was added in the same time. Then the reactor content was kept at this temperature for 120 minutes and then cooled to ambient temperature. The pH was adjusted to 8 to 8.5 with 12.5% aqueous ammonia. The resultant product P3 was filtered and collected.

The properties of P3 are listed in Table 4.

Preparation of the Dispersed Urethane Acrylic Polymer P4

Stage 1: A 1-L 3-necked round bottom flask, equipped with a stirrer and a thermometer, was loaded with NMP (100.00 g), DMPA (24.00 g), Desmodur W (152.68 g) and Priplast 3192 (223.33 g) in a nitrogen atmosphere. The reaction mixture was heated to 55° C., tin octoate (0.05) was added and the temperature was raised to 90–95° C. The mixture was kept at this temperature for 1 hour before adding tinoctoate (0.05) and the mixture was kept at 90° C. for an additional hour. The NCO-concentration of the mixture was found to be 4.83%. The resulting NCO terminated urethane prepolymer (500.05 g) (from which samples of a total weight of 10.0 g were taken for % NCO determination, leaving 490.05 g of prepolymer) was then cooled to 70° C., neutralised with TEA (17.75 g) diluted with BMA (196.02 g) and homogenised for 15 minutes at 65° C.

Stage 2: A 2-L 3-necked round bottom flask, equipped with a stirrer and thermometer, was loaded with a water phase consisting of water (1045.77 g) and BMA (174.00 g) in a nitrogen atmosphere. A portion of the urethane prepolymer (625.00) prepared in Stage 1 (at 60–65° C.) was fed into the reactor over 1 hour, keeping the temperature of the reactor contents below 30° C. After the feed was complete, the mixture was stirred for an additional 5 minutes before chain-extension by the addition of an aqueous 64.45% hydrazine hydrate solution ($N_2H_4.H_2O$, 11.43 g in 25.00 g $H_2O$). A reactor temperature of 36° C. was reached. Subsequently, a 5% aqueous initiator solution of t-BHPO (18.10 g) and a 1% aqueous solution of $Fe^{III}.EDTA$; 4.63 g) was added to the reaction mixture. The radical polymerisation was started by the addition of a 1% aqueous iAA (45.24 g) and the reaction temperature was allowed to reach 56° C. before more aqueous iAA (45.24 g) was added. The reaction mixture was homogenised for 15 minutes, then cooled to room temperature, filtered over a 200-mesh sieve and collected. The properties of P4 are listed in Table 4.

Preparation of Dispersed Vinyl Polymer P5

A 2-L 3-necked round bottom glass reactor, equipped with stirrer, thermometer and baffles, was loaded with demineralised water (990.94 g), SLS 30% (0.55 g) and $NaHCO_3$ (4.44 g) in a nitrogen atmosphere. The mixture was heated whilst stirring to 80° C. and then a solution of AP (0.89 g) in demineralised water (5.00 g) was added. STY (468.54 g), 2-EHA (361.69 g) and M (58.00 g) were mixed in a dropping funnel. 10% of this mixture was added to the reactor at 80° C. and remainder was fed into the reactor over 100 minutes at 85° C. The content of a separate dropping funnel, containing demineralised water (50.00 g), AP (0.89 g) and SLS 30% (29.06 g) was added in the same time and the reactor content was kept at 85° C. for 45 minutes and then cooled to 60° C. At 60° C. a burn-up was applied by adding a solution of iAA (2.60 g) in demineralised water (49.00 g) to the reactor followed by a mixture of t-BHPO (80%, 2.40 g) and demineralised water (18.00 g). After 60 minutes the reactor content was cooled to ambient temperature. The pH was adjusted to 8 to 8.5 with 12.5% aqueous ammonia. The product P5 was filtered and collected. The properties of P5 are listed in Table 4.

Preparation of Dispersed Polymers P6 to P11

The dispersed polymers P6 to P11 were prepared using the method described for P5 with the variations as listed in Table 3a. The properties of P6 to P11 are listed in Table 4. The Mn and Mw of P1 to P12 could not be measured.

Preparation of a Fatty Acid Functional Dispersed Polymer P12

In a 1L 3-necked round bottom reactor, equipped with stirrer and $N_2$ inlet, Nouracid LE80 (398.8 g), GMA (201.2 g), Irganox 1010 (0.10 g), Phenothiazine (0.10 g) and benzyl trimethylammonium hydroxide (40 wt % in water; 1.05 g) were loaded. The reactor was purged with nitrogen and the yellow reaction mixture was heated and stirred at 155° C. until the acid value had dropped to 3.7 mg KOH/g. After cooling to ambient temperature, the product was collected and stored under nitrogen.

A portion of 161.3 g of this adduct was mixed with MAA (40.3 g) and transferred into a dropping funnel. This mixture was slowly added over a period of one hour to a 1L 3-necked round bottom reactor containing a solution of lauroyl peroxide (21.4 g) in butyl glycol (273.0 g) at 125° C. in a nitrogen atmosphere. After complete addition, the resulting copolymer solution was cooled to 50° C. and subsequently concentrated in vacuo to 80% solids using a rotary evaporator. To the resulting yellow solution, a mixture of water (580.0 g), aqueous ammonia (25%; 12.0 g) and SLS (4.4 g) was added at 70° C. A mixture of MMA (225.5 g) and BA (92.5 g) was added to the resulting dispersion and the reaction mixture was stirred for 30 minutes at 70° C. The reaction mixture was heated to 85° C. and a solution of ammonium persulphate (0.86 g) in water (20.0 g) was added over a period of 10 min. The mixture was stirred at 85° C. for 3 h. Then a second portion of ammonium persulphate (0.86 g) in water (20.0 g) was added and the mixture was stirred at 85° C. for 30 minutes. Then a third portion of ammonium persulphate (0.86 g) in water (20.0 g) was added and the mixture was stirred for an additional 30 minutes at 85° C. The resulting dispersion was cooled to ambient temperature, filtered and stored under nitrogen. The dispersion had a solids content of 39.3%, a pH of 7.7 and contained 2.59% butyl glycol on total dispersion.

TABLE 3

| Components (g) | P6 | P7 | P8 | P9 | P10 | P11 |
|---|---|---|---|---|---|---|
| Reactor phase | | | | | | |
| Water | 912.19 | 960.66 | 990.94 | 1001.24 | 960.66 | 990.94 |
| SLS 30% | — | 72.94 | 0.55 | — | 72.94 | 0.55 |
| Surfactant | 0.83 | — | — | — | — | — |
| $NaHCO_3$ | 4.12 | 4.38 | 4.44 | 4.46 | 4.38 | 4.44 |
| Shot at 80° C. | | | | | | |
| AP | 0.83 | 0.88 | 0.89 | 0.89 | 0.88 | 0.89 |
| Water | 5.00 | 5.00 | 5.00 | 5.00 | 5.00 | 5.00 |
| Monomer mixture | | | | | | |
| STY | — | — | — | — | — | 399.70 |
| MMA | 577.36 | 332.60 | 617.32 | 352.94 | 759.26 | 124.35 |
| BA | 236.86 | 402.63 | 253.15 | 521.85 | 89.76 | 133.24 |
| BMA | — | — | — | — | — | 204.29 |

TABLE 3-continued

| Components (g) | P6 | P7 | P8 | P9 | P10 | P11 |
|---|---|---|---|---|---|---|
| AA | 16.62 | — | 17.77 | 17.85 | 17.51 | 17.77 |
| MAA | — | 87.53 | — | — | — | — |
| Dynasilan MEMO | 41.54 | — | — | — | — | — |
| HEMA | — | 52.52 | — | — | — | — |
| TEGDMA | — | — | — | — | 8.75 | — |
| IOTG | — | — | — | — | — | — |
| AAEM | — | — | — | — | — | — |
|  |  |  | Separate feed |  |  |  |
| Water | 50.00 | 50.00 | 50.00 | 50.00 | 50.00 | 50.00 |
| AP | 0.83 | 0.88 | 0.89 | 0.89 | 0.88 | 0.89 |
| SLS 30% | — | — | 29.06 | 14.88 | — | 29.06 |
| Surfactant | 123.79 | — | — | — | — | — |

P11 only = Burn-up at 60° C. with IAA (0.88 g) water (12 g) tBHPO (0.88 g) and water (26.7 g)

TABLE 4

| | Parameter | | | | | | | | | | | |
|---|---|---|---|---|---|---|---|---|---|---|---|---|
| | P1 | P2 | P3 | P4 | P5 | P6 | P7 | P8 | P9 | P10 | P11 | P12 |
| Solids [wt %] | 51.2 | 45.1 | 50.3 | 35.2 | 42.4 | 44.6 | 21.4 | 45.0 | 45.0 | 44.6 | 44.3 | 39.3 |
| pH | 8.3 | 8.3 | 8.2 | 7.9 | 8.3 | 8.2 | 8.0 | 8.2 | 8.2 | 8.3 | 8.2 | 7.7 |
| Particle size [nm] | 450 | 230 | 330 | 65 | 255 | 390 | 69 | 307 | 590 | 67 | 230 | — |
| Measured Tg*[° C.] | 25 | 2 | 24 | 43 | 27 | 58 | 40 | 57 | 2 | 96 | 54 | 49 |
| Acid value** | 15.6 | 15.6 | 0 | 12.4 | 50.6 | 15.6 | 63.4 | 15.6 | 15.6 | 15.6 | 15.6 | — |

*with DSC (midpoint)
**Theoretical on solids [mgKOH/g]

Preparation of Blends of the Dispersed Oligomers and Dispersed Polymers Prepared Above:

Preparation of a Blend of Dispersed Oligomer dV2 and Dispersed Polymer P1=V2 P1

A 1L 3-necked round bottom flask, equipped with stirrer and $N_2$-inlet, was loaded with oligomer dispersion dV2 (60 g) in a nitrogen atmosphere. To this was added water (20 g) and vinyl polymer P1 (20 g). The mixture was stirred for 30 minutes and stored under a nitrogen atmosphere. The resultant dispersed blend V2P1 has a solid content of 25% by weight.

The oligomer/polymer blend dispersions listed in Table 5 below were prepared using the method described above for V2P1.

TABLE 5

| Components | V2P1 | V2P2 | V2P3 | V2P4* | V3P5 | V4P6 |
|---|---|---|---|---|---|---|
| Oligomer code | dV2 | DV2 | dV2 | DV2 | dV3 | dV4 |
| Oligomer (g) | 60 | 60 | 40 | 54.6 | 40 | 60 |
| Polymer code | P1 | P2 | P3 | P4 | P5 | P6 |
| Polymer (g) | 20.00 | 22.22 | 29.82 | 45.4 | 35.29 | 22.42 |
| Oligomer (% of solids) | 60 | 60 | 40 | 40 | 40 | 60 |
| Polymer (% of solids) | 40 | 40 | 60 | 60 | 60 | 40 |
| Water (g) | 20.00 | 17.78 | 30.18 | — | 24.71 | 17.58 |
| Dispersion solids (%) | 25.2 | 25.0 | 25.0 | 40.0 | 25.0 | 25.0 |

| Components | V5P7 | V6P8** | V7P9 | V3U1P10 | V2V4U2P11*** |
|---|---|---|---|---|---|
| Oligomer code | dV5 | dV6 | DV7 | d(V3U1) | DV2V4U2 |
| Oligomer (g) | 50 | 84.4 | 15 | 12/49 | 13.9/6.9/48.0 |
| Polymer code | P7 | P8 | P9 | P10 | P11 |
| Polymer (g) | 33.78 | 15.6 | 47.22 | 22.42 | 21.7 |
| Oligomer (% of solids) | 50 | 80 | 15 | 60 | 59 |
| Polymer (% of solids) | 50 | 20 | 85 | 40 | 41 |
| Water (g) | 16.22 | — | 37.78 | 15.99 | 9.53 |
| Dispersion solids (%) | 25.0 | 35.0 | 25.0 | 25.0 | 33.6 |

| Components | V8P5 | V8V2P12 | Comparative V3P5 |
|---|---|---|---|
| Oligomer code | dV8 | d(V8V2) | DV3 |
| Oligomer (g) | 50 | 28/28 | 7 |
| Polymer code | P5 | P12 | P5 |
| Polymer (g) | 29.41 | 47.19 | 54.83 |
| Oligomer (% of solids) | 40 | 40 | 7 |
| Polymer (% of solids) | 60 | 60 | 93 |
| Water (g) | 15.59 | — | 38.17 |
| Additive type | Atlas G4809 (20%)/ADH | ADH | — |
| Additive amount (g) | 5.0/1.35 | 0.76 | — |
| Dispersion solids (%) | 26.0 | 33.9 | 25.0 |

*oligomer dispersion is used at 44% solids
**oligomer dispersion is used at 33.15% solids
***oligomer dispersions are used at 45.7% solids

EXAMPLE 1

Pigmented Paint Composition Comprising Oligomer Dispersion dV1

A 1l 3 necked round bottom flask equipped with a stirrer was loaded with dispersion dV1 (100 g) in a nitrogen atmosphere. $TiO_2$-based pigment paste C830 (30.78 g; solid content 72%), a flow agent Byk 344 (0.1 g), and a urethane thickener (Borchigel L75, available from Bayer, 50% in water) were added and the mixture was stirred for 30 minutes at ambient temperature and the resulting composition was allowed to stand overnight. Before measuring the equilibrium viscosity and testing the properties of the composition the viscosity of the composition was adjusted to 4000 to 6000 mPa·s. using Borchigel L75 (50%).

Pigment paste C830 is formulated as $TiO_2$ (24.0 g), propylene glycol (2.4 g), water (3.3 g), AMP95 (2-amino-2-methyl-1-propanol available from lntegrated Chemicals bv, 0.2 g), Dehydran 1293 (defoamer additive available from Gognis, 0.5 g, 10% in butylglycol), Surfinol 104E (wetting agent available from Air Products 0.4 g, 50% in ethylene glycol) and Neocryl BT-24 (Acrylic emulsion polymer available from NeoResins, Avecia BV, 3.1 g).

Further examples 2 to 14 and comparative example 17 were prepared as described above with components as listed in Table 6. Example 15 was prepared as a clear example with no pigment and in example 16 iron oxide pigment was used instead of C830 TiO$_2$. The drying characteristics and other properties of these examples are also presented in Table 6.

Water Resistance, Thumb Hard and Sandability Results

The thumb hard test result for Example 10 was 6 hours; Example 11, 5 hours; Example 12, 6 hours; Comparative Example 17, 5 hours; Comparative Example 18, 2 hours and Comparative Example 19, 1 hour.

The sandability test result for Example 9 was 24 hours; Example 10, 72 hours; Example 11, 18 hours and Example 12, 24 hours.

Comparative Example 18 (C18)

P5 (150 g) was formulated with butylglycol (12.72 g) and thickened with Borchigel L75N to a viscosity of 4000 to 6000 mpa·s.

Comparative Example 17 (C17)

P7 (100 g) was used as prepared above.

TABLE 6

| | Example | | | | | | |
|---|---|---|---|---|---|---|---|
| | 1 | 2 | 3 | 4 | 5 | 6 | 7 |
| Blend code | dV1 | V2P1 | V2P2 | V2P3 | V2P4 | V3P5 | V4P6 |
| Blend amount (g) | 100 | 100 | 100 | 100 | 100 | 100 | 100 |
| Pigment paste C830 (g) | 30.78 | 30.78 | 30.78 | 30.78 | 49.24 | 30.78 | 30.78 |
| pH | 10.1 | 10.3 | 10.2 | 10.1 | 10.3 | 10.2 | 10.6 |
| Open time (min) | 55 | 60 | 55 | 60 | 50 | 56 | 55 |
| Wet edge time (min) | 30 | 15 | 12 | 12 | 20 | 27 | 11 |
| Dust-free time (min) | 150 | 70 | 42 | 80 | 55 | 41 | 33 |
| Tack-free time (hours) | 19 | 18 | 5 | 18 | 5 | 4 | 1.5 |
| Start yellowing | 3.67 | 5.30 | 6.46 | 8.05 | 2.63 | 3.61 | 3.10 |
| Dark yellowing (Δb-dark) | 6.87 | 2.27 | 2.13 | 1.98 | 1.71 | 1.51 | 0.16 |
| Daylight yellowing (Δb-day) | 4.33 | 0.40 | 1/37 | 2.83 | 2.40 | 0.64 | 0.40 |

| | Example | | | | |
|---|---|---|---|---|---|
| | 8 | 9 | 10 | 11 | 12 |
| Blend code | V5P7 | V6P8 | V7P9 | V3U1P10 | V2V4U2P11 |
| Blend amount (g) | 100 | 100 | 100 | 100 | 100 |
| Pigment paste C830 (g) | 30.78 | 43.09 | 30.78 | 30.78 | 30.78 |
| pH | 10.1 | 10.4 | 10.4 | 10.3 | 10.4 |
| Open time (min) | 30 | 54 | 45 | 70 | 60 |
| Wet edge time (min) | 10 | 14 | 14 | 15 | 24 |
| Dust-free time (min) | 30 | 65 | 50 | 55 | 45 |
| Tack-free time (hours) | 5 | 8 | 5 | 5 | 5 |
| Start yellowing | 2.29 | 4.15 | 4.39 | 4.47 | 2.82 |
| Dark yellowing (Δb-dark) | — | 3.30 | 1.90 | 2.06 | 1.84 |
| Daylight yellowing (Δb-day) | — | 1.48 | 0.46 | 1.41 | 1.12 |

| | Example | | | | | | |
|---|---|---|---|---|---|---|---|
| | 13 | 14 | 15 | 16 | C17 | C18 | C19 |
| Blend code | V8P5 | V8V2P12 | V6P8 | V7P9 | V3P5 | P5 | P7 |
| Blend amount (g) | 100 | 100 | 100 | 100 | 100 | 150 | 100 |
| Pigment paste C380 (g) | 30.78 | 30.78 | — | PW602 (1.2) | 30.78 | — | — |
| pH | 10.3 | 10.3 | 10.1 | 10.3 | 10.5 | — | — |

TABLE 6-continued

| Open time (min) | 34 | 42 | 51 | 45 | 18 | 35 | 45 |
|---|---|---|---|---|---|---|---|
| Wet edge time (min) | 18 | 22 | 22 | 31 | 8 | 7 | 8 |
| Dust-free time (min) | 33 | 28 | 21 | 25 | 23 | 15 | 30 |
| Tack-free time (hours) | 14 | 2.45 | 18 | 18 | 1.42 min | 1.5 | 0.5 |
| Start yellowing | 2.32 | 2.86 | — | — | — | — | — |
| Dark yellowing (Δb-dark) | 0.47 | 3.13 | — | — | — | — | — |
| Daylight yellowing (Δb-day) | — | — | — | — | — | — | — |

Comparative Example 20 (C20)

A 1-L 3-necked round bottom flask, equipped with a stirrer and a thermometer, was loaded with 1-methoxy-2-hydroxy propane (MHP, 75.0 gram) and heated under reflux at 120° C. A mixture of EA (74.7 gram), MMA (67.5 gram), M (90 gram), MPEG350MA (2.4 gram) and tert-butyl peroxy 2-ethylhexanoate (tBPEH, 11.73 gram) was added over a period of 3 hours. During this period it was necessary to add additional MHP (100 gram) to reduce viscosity of the reaction mixture. Refluxing was continued for an additional 15 minutes and a two additional amounts of tBPEH (1.5 gram each) were added to complete the polymerisation. The solution was cooled to 90–95° C. and allyl glycidyl ether (65.4 g) was added together with benzyl trimethyl ammonium hydroxide (1.0 gram, 40 wt % in water). The solution was heated to 120° C. under reflux until the acid value had fallen below 5 mg KOH/g solids. The solution was cooled to ambient temperature. The water solubility and water and ammonia (12.5%) resistance of this oligomer were compared to those of example 4 (table 6).

The water solubility was 91.9%. The water and ammonia (12.5%) resistances of this oligomer were compared to that of vinyl oligomer V2. The data is shown in Table 7 and 0=poor and 5=good.

TABLE 7

| Oligomer | water solubility (%) | water | ammonia |
|---|---|---|---|
| Comparative Example 20 | 91.9 | 3 | 1 |
| Vinyl oligomers V2 | 4.2 | 5 | 5 |

The equilibrium viscosity measurements for examples 1 to 16 prepared above was measured using a range of shear rates and the results are shown in Tables 8 to 22 below.

TABLE 8

| | Example 1 | | | | |
|---|---|---|---|---|---|
| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
| 5.0 | 38.39 | 7 | 5 | 4 | 3 |
| 10.0 | 40.38 | 12 | 9 | 5 | 4 |
| 15.0 | 41.30 | 3 | 7 | 6 | 4 |
| 20.0 | 42.95 | 20 | 11 | 7 | 6 |
| 25.0 | 44.85 | 33 | 13 | 9 | 6 |
| 30.0 | 46.49 | 36 | 16 | 11 | 8 |

TABLE 8-continued

Example 1

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 35.0 | 48.31 | 54 | 22 | 13 | 9 |
| 40.0 | 50.37 | 89 | 29 | 17 | 11 |
| 45.0 | 52.52 | 67 | 26 | 16 | 11 |
| 50.0 | 54.69 | 613 | 43 | 22 | 14 |
| 55.0 | 57.24 | 185 | 45 | 22 | 14 |
| 60.0 | 59.52 | 579 | 68 | 34 | 18 |
| 65.0 | 61.76 | 555 | 68 | 31 | 17 |
| 70.0 | 64.42 | 1000 | 236 | 115 | — |
| 75.0 | 66.67 | 1110 | 150 | 83 | 32 |
| 80.0 | 68.80 | 13100 | 4590 | — | — |
| 85.0 | 70.49 | 61600 | 21300 | — | — |

TABLE 9

Example 2

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 5.0 | 39.11 | 5 | 6 | 5 | 5 |
| 10.0 | 42.01 | 3 | 7 | 7 | — |
| 15.0 | 45.11 | 9 | 4 | 6 | 5 |
| 20.0 | 47.04 | 2 | 6 | 7 | 4 |
| 25.0 | 50.48 | 9 | 6 | 7 | 4 |
| 30.0 | 53.00 | 11 | 6 | 6 | 5 |
| 35.0 | 56.38 | 8 | 8 | 6 | 5 |
| 40.0 | 59.66 | 42 | 15 | 6 | 6 |
| 45.0 | 63.35 | 166 | 35 | 22 | 12 |
| 50.0 | 66.81 | 1270 | 247 | 51 | — |
| 55.0 | 69.89 | 5440 | 791 | 86 | 31 |
| 60.0 | 72.11 | 14100 | 2000 | 136 | 30 |
| 65.0 | 73.78 | 20100 | 3510 | 242 | — |
| 70.0 | 74.82 | 31100 | 5690 | 452 | 115 |

TABLE 10

Example 3

| Time (min) | Calculated Solids (%) | Shear rate 0.0997 s$^{-1}$ Viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 5.0 | 39.71 | 12 | 11 | 6 | 6 |
| 10.0 | 41.21 | 10 | 10 | 8 | 6 |
| 15.0 | 43.56 | 9 | 10 | 9 | 7 |
| 20.0 | 45.43 | 6 | 11 | 101 | 8 |
| 25.0 | 47.81 | 27 | 13 | 13 | 9 |
| 30.0 | 50.93 | 41 | 20 | 15 | 10 |
| 35.0 | 54.13 | 27 | 20 | 17 | 12 |
| 40.0 | 56.65 | 69 | 29 | 19 | 9 |
| 45.0 | 59.85 | 190 | 44 | 27 | 10 |
| 50.0 | 63.81 | 75 | 42 | 30 | 11 |
| 55.0 | 67.35 | 285 | 39 | 27 | 10 |
| 60.0 | 72.57 | 2040 | 731 | — | — |
| 65.0 | 75.75 | 11700 | 2580 | 457 | — |

TABLE 11

Example 4

| Time (min) | Calculated Solids (%) | Shear rate 0.0997 s$^{-1}$ Viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 5.0 | 39.38 | 2 | 11 | 11 | 9 |
| 10.0 | 40.72 | 13 | 9 | 12 | 10 |
| 15.0 | 42.49 | 4 | 17 | 17 | 13 |
| 20.0 | 44.73 | 3 | 17 | 19 | 15 |
| 25.0 | 46.70 | 11 | 19 | 19 | 14 |
| 30.0 | 48.85 | 15 | 23 | 22 | 15 |
| 35.0 | 51.83 | 24 | 26 | 23 | 16 |
| 40.0 | 54.49 | 13 | 24 | 22 | 13 |
| 45.0 | 57.36 | 19 | 27 | 24 | 12 |
| 50.0 | 60.63 | 37 | 36 | 21 | 10 |
| 55.0 | 63.67 | 122 | 73 | 36 | — |
| 60.0 | 66.78 | 1260 | 651 | 302 | 214 |
| 65.0 | 70.61 | 5610 | 2020 | 86 | — |
| 70.0 | 72.21 | 10900 | 3490 | 1260 | 229 |
| 75.0 | 74.46 | 19600 | 7860 | 2320 | — |

TABLE 12

Example 5

| Time (min) | Calculated Solids | Shear Rate 0.0997 s$^{-1}$ viscosity (Pa·s) | Shear Rate 0.990 s$^{-1}$ viscosity (Pa·s) | Shear Rate 9.97 s$^{-1}$ viscosity (Pa·s) | Shear Rate 78.6 s$^{-1}$ viscosity (Pa·s) |
|---|---|---|---|---|---|
| 5.0 | 39.16 | 4 | 7 | 5 | 3 |
| 10.0 | 41.87 | 5 | 6 | 4 | 3 |
| 15.0 | 44.55 | 3 | 6 | 5 | 3 |
| 20.0 | 47.60 | 9 | 7 | 5 | 3 |
| 25.0 | 50.62 | 19 | 10 | 6 | 3 |
| 30.0 | 54.32 | 63 | 28 | 11 | 5 |
| 35.0 | 57.67 | 1230 | 200 | 44 | 15 |
| 40.0 | 60.67 | 4160 | 621 | 125 | 14 |
| 45.0 | 63.62 | 15300 | 2390 | 248 | 47 |
| 50.0 | 66.46 | 25300 | 3990 | 353 | 161 |
| 55.0 | 67.84 | 38200 | 6510 | 659 | 254 |
| 60.0 | 69.43 | 59400 | 11100 | 1800 | — |
| 65.0 | 70.63 | 65700 | 13300 | 1470 | — |

TABLE 13

Example 6

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 5.0 | — | — | — | — | — |
| 7.0 | — | — | — | — | — |
| 14.0 | 40.78 | 200 | 85 | 40 | 16 |
| 19.0 | 43.08 | 126 | 13 | 28 | 13 |
| 24.0 | 45.71 | 188 | 117 | 49 | 3 |
| 28.0 | 47.93 | 126 | 84 | 45 | 6 |
| 33.0 | 50.99 | 817 | 257 | 64 | — |
| 43.0 | 54.11 | 960 | 263 | 70 | — |
| 48.0 | 57.73 | 3090 | 877 | 269 | — |
| 53.0 | 61.31 | 4380 | 1510 | 543 | — |
| 60.0 | 65.37 | 48700 | 10800 | 2570 | — |

TABLE 14

Example 7

| Time (min) | Calculated Solids (%) | Shear rate 0.0997 s$^{-1}$ Viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ Viscosity (Pa·s) |
|---|---|---|---|---|---|
| 5.0 | 38.39 | 7 | 5 | 4 | 3 |
| 10.0 | 40.38 | 12 | 9 | 5 | 4 |
| 15.0 | 41.30 | 3 | 7 | 6 | 4 |
| 20.0 | 42.95 | 20 | 11 | 7 | 6 |
| 25.0 | 44.85 | 33 | 13 | 9 | 6 |
| 30.0 | 46.49 | 36 | 16 | 11 | 8 |
| 35.0 | 48.31 | 54 | 22 | 13 | 9 |
| 40.0 | 50.37 | 89 | 29 | 17 | 11 |
| 45.0 | 52.52 | 67 | 26 | 16 | 11 |
| 50.0 | 54.69 | 613 | 43 | 22 | 14 |
| 55.0 | 57.24 | 185 | 45 | 22 | 14 |
| 60.0 | 59.52 | 579 | 68 | 34 | 18 |
| 65.0 | 61.76 | 555 | 68 | 31 | 17 |
| 70.0 | 64.42 | 1000 | 236 | 115 | — |
| 75.0 | 66.67 | 1110 | 150 | 83 | 32 |
| 80.0 | 68.80 | 13100 | 4590 | — | — |
| 85.0 | 70.49 | 61600 | 21300 | — | — |

TABLE 15

Example 9

| Time (min) | Calculated Solids (%) | Shear rate 0.0997 s$^{-1}$ viscosity (Pa·s) | Shear rate 0.990 s$^{-1}$ Viscosity (Pa·s) | Shear rate 9.97 s$^{-1}$ viscosity (Pa·s) | Shear rate 78.6 s$^{-1}$ Viscosity (Pa·s) |
|---|---|---|---|---|---|
| 5.0 | 37.20 | — | — | — | — |
| 6.0 | 37.77 | 43 | 30 | 11 | 5 |
| 10.0 | 40.14 | — | — | — | — |
| 13.0 | 40.72 | 90.6 | 61 | 25 | 5 |
| 18.0 | 43.61 | 70.8 | 49 | 20 | 5 |
| 24.0 | 45.61 | 239 | 175 | 55 | — |
| 30.0 | 48.22 | 191 | 144 | 47 | 8 |
| 35.0 | 50.90 | 246 | 195 | 70 | 1 |
| 40.0 | 53.65 | 434 | 182 | 67 | 1 |
| 45.0 | 56.71 | 243 | 168 | 74 | 2 |
| 50.0 | 59.93 | 294 | 168 | 73 | 9 |
| 56.0 | 63.41 | 2920 | 445 | 86 | — |
| 62.0 | 66.27 | 4430 | 557 | 90 | 22 |

TABLE 16

Example 10

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 5.0 | 39.38 | 35 | 24 | 17 | — |
| 10.0 | 40.44 | 3 | 20 | 20 | 15 |
| 15.0 | 43.09 | 11 | 25 | 22 | 13 |
| 20.0 | 45.52 | 27 | 32 | 27 | 12 |
| 25.0 | 48.17 | 91 | 51 | 35 | 9 |
| 30.0 | 51.30 | 163 | 55 | 41 | 12 |
| 35.0 | 54.97 | 197 | 88 | 56 | 14 |
| 40.0 | 62.50 | 298 | 122 | 54 | 13 |
| 45.0 | 63.00 | 367 | 127 | 55 | 12 |
| 50.0 | 67.45 | 2650 | 771 | 161 | — |
| 55.0 | 71.43 | 2090 | 568 | 114 | 20 |
| 60.0 | 77.02 | 98700 | 11900 | 1490 | — |

TABLE 17

Example 11

| Time (min) | Calculated Solids (%) | Shear rate 0.0997 s$^{-1}$ Viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 5.0 | 39.09 | 12 | 10 | 6 | 4 |
| 10.0 | 40.26 | 9 | 15 | 9 | 6 |
| 15.0 | 42.25 | 16 | 16 | 10 | 5 |
| 20.0 | 44.00 | 39 | 25 | 14 | 6 |
| 25.0 | 45.90 | 34 | 26 | 15 | 5 |
| 30.0 | 48.28 | 53 | 25 | 14 | 7 |
| 35.0 | 51.16 | 54 | 26 | 13 | 9 |
| 40.0 | 53.38 | 59 | 26 | 16 | 8 |
| 45.0 | 56.00 | 133 | 39 | 16 | 9 |
| 50.0 | 59.34 | 133 | 39 | 16 | 9 |
| 55.0 | 62.10 | 162 | 39 | 15 | 9 |
| 60.0 | 65.81 | 174 | 40 | 15 | 10 |
| 65.0 | 67.69 | 341 | 363 | 23 | 13 |
| 70.0 | 69.84 | 703 | 131 | 43 | 9 |
| 75.0 | 71.63 | 4410 | 994 | 127 | — |

TABLE 18

Example 12

| Time (min) | Calculated Solids (%) | Shear rate 0.0997 s$^{-1}$ Viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ Viscosity (Pa·s) |
|---|---|---|---|---|---|
| 5.0 | 38.98 | 14 | 4 | 2 | 1 |
| 10.0 | 40.65 | 11 | 5 | 2 | 1 |
| 15.0 | 42.98 | 12 | 2 | 2 | 2 |
| 20.0 | 45.42 | 11 | 2 | 2 | 2 |
| 25.0 | 48.09 | 4 | 4 | 3 | 3 |
| 30.0 | 50.43 | 19 | 9 | 5 | 4 |
| 35.0 | 53.25 | 55 | 19 | 8 | 5 |
| 40.0 | 55.87 | 103 | 34 | 13 | 8 |
| 45.0 | 60.90 | 304 | 74 | 20 | 8 |
| 50.0 | 62.08 | 931 | 156 | 34 | 6 |
| 55.0 | 64.23 | 7690 | 1500 | 36 | — |
| 60.0 | 67.30 | 17800 | 3030 | 120 | 2 |

TABLE 19

Example 13

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 2.0 | 38.30 | 20 | 0.3 | 1 | 1 |
| 6.0 | 39.50 | 2 | 1 | 1 | 1 |
| 10.0 | 41.00 | 5 | 1 | 2 | 1 |
| 15.0 | 42.80 | 5 | 3 | 3 | 2 |
| 20.0 | 44.20 | 3 | 4 | 3 | 2 |
| 25.0 | 46.03 | 10 | 7 | 5 | 3 |
| 30.0 | 47.08 | 2 | 8 | 6 | 4 |
| 35.0 | 49.80 | 3 | 13 | 9 | 5 |
| 40.0 | 51.50 | 3 | 22 | 13 | 7 |
| 45.0 | 53.50 | 93 | 39 | 18 | 10 |
| 50.0 | 55.40 | 232 | 75 | 33 | 9 |
| 55.0 | 57.40 | 1150 | 182 | 49 | 7 |
| 60.0 | 59.80 | 5780 | 1270 | — | — |
| 65.0 | 60.90 | 14700 | 4760 | — | — |

TABLE 20

Example 14

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 2.5 | 49.30 | 9 | 13 | 10 | — |
| 7.0 | 50.90 | 63 | 39 | 21 | 9 |
| 10.0 | 52.40 | 51 | 40 | 22 | 96 |
| 15.0 | 53.80 | 145 | 75 | 41 | 9 |
| 20.0 | 55.70 | 111 | 82 | 43 | 11 |
| 25.0 | 57.60 | 236 | 168 | 87 | 16 |
| 30.0 | 59.40 | 338 | 196 | 95 | 3 |
| 35.0 | 61.40 | 657 | 404 | — | — |
| 40.0 | 63.20 | 1150 | 77 | 368 | 19 |
| 45.0 | 65.10 | 4070 | 3070 | — | — |
| 50.0 | 67.30 | 10100 | 6170 | 1690 | 22 |
| 55.0 | 68.90 | 41500 | 11900 | 1400 | 32 |
| 60.0 | 70.60 | 88600 | 18400 | 457 | — |

TABLE 21

Example 15

| Time (min) | Calculated Solids (%) | Shear rate 0.0997 s$^{-1}$ Viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 0.0 | 35.00 | — | — | — | — |
| 3.0 | 44.50 | 47 | 16 | 7 | 4 |
| 8.0 | 48.40 | 55 | 20 | 9 | 4 |
| 16.0 | 52.60 | 90 | 28 | 16 | 2 |
| 21.0 | 57.10 | 101 | 34 | 22 | 1 |
| 26.0 | 62.80 | 174 | 107 | 53 | 5 |
| 32.0 | 67.60 | 187 | 119 | 49 | 1 |
| 38.0 | 72.80 | 172 | 130 | 81 | — |
| 44.0 | 77.60 | 71 | 109 | 78 | 11 |
| 50.0 | 80.30 | 67 | 42 | 31 | 42 |
| 56.0 | 84.00 | 806 | 216 | 84 | 43 |

TABLE 22

Example 16

| Time (min) | Calculated Solids (%) | Shear rate 0.0997 s$^{-1}$ Viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 0.0 | 40.00 | — | — | — | — |
| 4.0 | 42.80 | 110 | 17 | 10 | — |
| 10.0 | 45.10 | 63 | 18 | 13 | 7 |
| 16.0 | 52.00 | 119 | 39 | 22 | 7 |
| 21.0 | 55.20 | 79 | 4 | 9 | 8 |
| 28.0 | 58.40 | 360 | 114 | 46 | 6 |
| 33.0 | 62.20 | 346 | 104 | 44 | 4 |
| 39.0 | 66.10 | 1520 | 289 | 65 | 6 |
| 44.0 | 70.50 | 1170 | 251 | 66 | — |
| 51.0 | 73.90 | 776 | 234 | 31 | 6 |
| 56.0 | 77.00 | 1330 | 236 | 39 | 4 |
| 64.0 | 78.80 | 6900 | — | — | — |
| 67.0 | 79.60 | 25700 | 4410 | — | — |

TABLE 23

Example C18

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 3.0 | 41.74 | 506 | 104 | 16 | 3 |
| 9.0 | 46.28 | 1465 | 341 | 59 | 13 |
| 14.5 | 50.99 | 5043 | 1334 | 305 | 51 |
| 23.0 | 59.16 | 16240 | 5356 | 910 | 193 |
| 29.0 | 65.50 | 22290 | 12750 | 2040 | 448 |

TABLE 24

Example C19

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 0. | 22.20 | 68 | 28 | 10 | 3 |
| 5.0 | 24.03 | 120 | 56 | 18 | 4 |
| 12.0 | 26.54 | 1156 | 422 | 82 | 15 |
| 18.0 | 28.93 | 5804 | 1588 | 212 | 33 |
| 24.0 | 31.81 | 8118 | 2073 | 289 | 69 |
| 31.0 | 36.13 | 12560 | 4273 | 568 | 116 |
| 38.0 | 41.88 | 12720 | 3278 | 415 | 78 |
| 44.0 | 48.27 | 33020 | 8738 | 1087 | 186 |

The invention claimed is:

1. An aqueous coating composition comprising an ambient temperature self-crosslinkable water-dispersible vinyl oligomer(s) having a measured weight average molecular weight in the range of from 1,000 to 80,000 Daltons and dispersed vinyl polymer(s) and 0 to 25% of co-solvent by weight of the composition where the ratio of said self-crosslinkable vinyl oligomer(s) to the dispersed vinyl polymer(s) is in the range of from 90:10 to 10:90 and said dispersed vinyl polymer(s) has a measured weight average molecular weight ≧90,000 Daltons and wherein said composition when drying at ambient temperature crosslinks to form a coating that has the following properties:
   i) an open time of at least 20 minutes at 23+/−2° C.;
   ii) a wet edge time of at least 10 minutes at 23+/−2° C.;
   iii) a tack-free time of ≦20 hours at 23+/−2° C.; and
   iv) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23±2° C.; and
wherein said self-crosslinkable water-dispersible vinyl oligomer(s) is ≦60% by weight soluble in water throughout a pH range of from 2 to 10.

2. An aqueous coating composition according to claim 1 wherein said self-crosslinkable water-dispersible vinyl oligomer(s) has a solution viscosity ≦150 Pa·s, as determined from a 80% by weight solids solution of said self-crosslinkable water-dispersible vinyl oligomer(s) in at least one of the solvents selected from the group consisting of N-methylpyrrolidone, n-butylglycol and mixtures thereof, using a shear rate of 90±5 s$^{-1}$ and at 50±2° C.

3. An aqueous coating composition according to claim 1 wherein said self-crosslinkable water-dispersible vinyl oligomer(s) has a solution viscosity ≦250 Pa·s, as determined from a 70% by weight solids solution of said self-crosslinkable water-dispersible vinyl oligomer(s) in a solvent mixture consisting of:

i) at least one of the solvents selected from the group consisting of N-methylpyrrolidone, n-butylglycol and mixtures thereof;
ii) water and
iii) N,N-dimethylethanolamine;
where i), ii) and iii) are in weight ratios of 20/7/3 respectively, using a shear rate of 90±5 s$^{-1}$ and at 23±2° C.

4. An aqueous composition according to any one of claims 1, 2 or 3 wherein said composition has an equilibrium viscosity ≦5,000 Pa·s when measured using any shear rate in the range of from 0.09±0.005 to 90±5 s$^{-1}$, and an equilibrium viscosity of ≦3,000 Pa·s when measured using any shear rate in the range of from 0.9±0.05 to 90±5 s$^{-1}$, and an equilibrium viscosity of ≦1,500 Pa·s when measured using any shear rate in the range of from 9±0.5 to 90±5 s$^{-1}$, at any solids content when drying in the range of from 20 to 55% by weight of the composition and at 23±2° C.

5. An aqueous composition according to any one of claims 1, 2 or 3 wherein said composition has an equilibrium viscosity ≦5,000 Pa·s when measured using any shear rate in the range of from 0.09±0.005 to 90±5 s$^{-1}$ after a 12% increase of the solids content by weight of the composition when drying.

6. An aqueous composition according to any one of claims 1, 2 or 3 wherein the self-crosslinkable water-dispersible vinyl oligomer(s) has a PDi≦15.

7. An aqueous composition according to any one of claims 1, 2 or 3 wherein the self-crosslinkable water-dispersible vinyl oligomer(s), when a precursor vinyl oligomer(s), has a measured Tg in the range of from −90 to 100° C.

8. An aqueous coating composition according to any one of claims 1, 2 or 3 comprising:
i) 15 to 40% of a crosslinkable oligomer(s) by weight of total binder solids of which at least 52 wt % is said self-crosslinkable water-dispersible vinyl oligomer(s);
ii) 0 to 10% of a non-crosslinkable oligomer(s) by weight of total binder solids;
iii) 50 to 85% of dispersed vinyl polymer(s) by weight of total binder solids;
where i)+ii)+iii)=100%.

9. An aqueous coating composition according to any one of claims 1, 2 or 3 additionally comprising a pigment.

10. An aqueous composition according to claim 1 wherein the dispersed vinyl polymer(s) has particle size in the range of from 25 to 1000 nm.

11. An aqueous composition according to claim 1 wherein the dispersed vinyl polymer(s) has an acid value below 160 mgKOH/g.

12. An aqueous composition according to claim 1 wherein the dispersed vinyl polymer(s) is crosslinkable.

13. An aqueous composition according to claim 1 wherein the dispersed vinyl polymer(s) has a measured Tg in the range of from −50 to 300° C.

14. An aqueous coating composition according to claim 1 comprising:
i) 0 to 15% co-solvent by weight of total binder solids;
ii) 35 to 65% of said self-crosslinkable water-dispersible vinyl oligomer by weight of total binder solids; wherein the self-crosslinkable water-dispersible vinyl oligomer(s) comprises 45 to 75 wt % of fatty acid groups; and wherein said dispersed vinyl polymer(s) has an acid value below 20 mgKOH/g.

15. An aqueous coating composition according to claim 1 comprising:
i) 3 to 26% of a crosslinkable oligomer(s) by weight of the composition of which at least 52 wt % is said self-crosslinkable water-dispersible vinyl oligomer(s);
ii) 0 to 6.5% of a non-crosslinkable oligomer(s) by weight of the composition;
iii) 10 to 56% of dispersed vinyl polymer(s) by weight of the composition;
iv) 0 to 15% of co-solvent by weight of the composition; and
v) 5 to 65% of water by weight of the composition;
where i)+ii)+iii)+iv)+v)=100%.

16. An aqueous composition comprising an ambient temperature self-crosslinkable water-dispersible vinyl oligomer(s) having a measured weight average molecular weight in the range of from 1,000 to 80,000 Daltons and a dispersed vinyl polymer(s) and 0 to 25% of co-solvent by weight of the composition where the ratio of said self-crosslinkable water-dispersible vinyl oligomer(s) to said dispersed vinyl polymer(s) is in the range of from 90:10 to 10:90 and wherein said composition when drying at ambient temperature crosslinks to form a coating having the following properties:
i) an open time of at least 20 minutes at 23+/−2° C.;
ii) a wet edge time of at least 10 minutes at 23+/−2° C.;
iii) a tack-free time of ≦20 hours at 23+/−2° C.; and
iv) an equilibrium viscosity of ≦3,000 Pa·s, at any solids content when drying in the range of from 20 to 55% by weight of the composition, using any shear rate in the range of from 9±0.5 to 90±5 s$^{-1}$ and at 23±2° C.; and
wherein said self-crosslinkable water-dispersible vinyl oligomer(s) is ≦60% by weight soluble in water throughout a pH range of from 2 to 10 and wherein the dispersed vinyl polymer(s) has a measured weight average molecular weight ≦90,000 Daltons with the proviso that the dispersed vinyl polymer(s) has a solution viscosity >150 Pa·s, as determined from a 80% by weight solids solution of the dispersed vinyl polymer(s) in at least one of the solvents selected from the group consisting of N-methylpyrrolidone, n-butylglycol and mixtures thereof, using a shear rate of 90±5 s$^{-1}$ and at 50±2° C.

17. An aqueous coating composition according to claim 1 or claim 16 wherein said self-crosslinkable water-dispersible vinyl oligomer is self-crosslinkable by autooxidation, Schiff-base crosslinking or a combination thereof.

18. A coating obtained from an aqueous composition according to any one of claims 1, 2 or 3.

19. A method of coating a substrate which comprises coating the substrate with an aqueous coating composition according to any one of claims 1, 2 or 3.

* * * * *